(12) United States Patent
Bouda et al.

(10) Patent No.: US 7,546,036 B2
(45) Date of Patent: Jun. 9, 2009

(54) HYBRID PASSIVE OPTICAL NETWORK USING SHARED WAVELENGTHS

(75) Inventors: Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 11/347,434

(22) Filed: Feb. 3, 2006

(65) Prior Publication Data

US 2007/0092251 A1  Apr. 26, 2007

Related U.S. Application Data

(60) Provisional application No. 60/729,447, filed on Oct. 20, 2005, provisional application No. 60/756,925, filed on Jan. 6, 2006.

(51) Int. Cl.
*H04J 14/00* (2006.01)
(52) U.S. Cl. .............................. 398/72; 398/63; 398/71
(58) Field of Classification Search .................. 398/58, 398/66, 67, 71, 72, 74, 63
See application file for complete search history.

(56) References Cited

U.S. PATENT DOCUMENTS

| | | | |
|---|---|---|---|
| 4,555,810 A | 11/1985 | Khoe et al. | |
| 5,285,305 A | 2/1994 | Cohen et al. | |
| 5,321,541 A | 6/1994 | Cohen | 359/127 |
| 5,440,416 A | 8/1995 | Cohen et al. | 359/127 |
| 5,579,421 A | 11/1996 | Duvall et al. | |
| 5,694,234 A | 12/1997 | Darcie et al. | 359/125 |
| 5,926,298 A | 7/1999 | Li | 359/120 |
| 6,144,472 A | 11/2000 | Knox | 359/127 |
| 6,163,637 A | 12/2000 | Zirngibl | 385/37 |

(Continued)

FOREIGN PATENT DOCUMENTS

EP  1 028 331 A2  8/2000

(Continued)

OTHER PUBLICATIONS

Handley et al., "A Comparison of WDM PON Architectures," Proceedings of the European Conference on Network and Optical Communications, Broadband Access and Technology. Amsterdam, IOS Press, NL, vol. part 1, pp. 141-147, Jan. 1, 1999.

(Continued)

*Primary Examiner*—Dzung D Tran
(74) *Attorney, Agent, or Firm*—Baker Botts L.L.P.

(57) ABSTRACT

In accordance with the teachings of the present invention, a hybrid passive optical network using shared wavelengths is provided. In a particular embodiment, a system for communicating optical signals over a network includes an upstream terminal. The upstream terminal includes a signal source operable to transmit a downstream signal comprising at least traffic in a first wavelength and traffic in a second wavelength. The upstream terminal is operable to receive upstream traffic in a third wavelength, wherein the third wavelength is shared by a first plurality of downstream terminals and a second plurality of downstream terminals. The system also includes a distribution node comprising a wavelength router. The wavelength router is operable to receive the downstream signal, route the traffic in the first wavelength to the first plurality of downstream terminals, and route the traffic in the second wavelength to the second plurality of downstream terminals.

27 Claims, 9 Drawing Sheets

U.S. PATENT DOCUMENTS

| | | | |
|---|---|---|---|
| 6,411,410 B1* | 6/2002 | Wright et al. | 398/79 |
| 6,498,876 B1 | 12/2002 | Liu et al. | 385/34 |
| 6,767,139 B2 | 7/2004 | Brun et al. | 385/84 |
| 7,245,829 B1* | 7/2007 | Sindile | 398/45 |
| 7,389,048 B2* | 6/2008 | Kani et al. | 398/72 |
| 2002/0196491 A1 | 12/2002 | Deng et al. | |
| 2003/0002102 A1* | 1/2003 | Khalfallah et al. | 359/124 |
| 2004/0001718 A1 | 1/2004 | Matthews et al. | |
| 2004/0131357 A1 | 7/2004 | Farmer et al. | |
| 2004/0184806 A1 | 9/2004 | Lee et al. | |
| 2005/0129404 A1 | 6/2005 | Kim et al. | 398/84 |
| 2005/0175343 A1* | 8/2005 | Huang et al. | 398/66 |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0153567 A1 | 7/2006 | Kim et al. | |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda | |
| 2007/0092254 A1 | 4/2007 | Bouda | |
| 2007/0092255 A1 | 4/2007 | Bouda | |
| 2007/0166037 A1 | 7/2007 | Palacharla et al. | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, mailed Feb. 14, 2007, 14 pages, mailed Feb. 14, 2007.

International Telecommunication Union, ITU-T Telecommunication Standardization Sector of ITU, "Gigabit-Capable Passive Optical Networks (G-PON): Transmission Convergence Layer Specification," Series G: Transmission Systems and Media, Digital Systems and Networks, ITU-T G.984.3, 116 pages, Feb. 2004.

Editor Recommendation G.984.3, International Telecommunication Union, Telecommunication Standardization Section, Study Period 2005-2008, "Updated Revised Amendment 1 to G.984.3, Gigabit-Capable Passive Optical Networks (G-PON): Transmission Convergence Layer Specification (for consent)," pp. 1-39, May 16, 2005 through May 27, 2005.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON," Korea Advanced Institute of Science and Technology; 2005 Optical Society of America, 3 pages, Mar. 6, 2005.

Smith, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letter, vol. 17, No. 3; pp. 717-719, Mar. 2005.

Suzuki et al.; "A Reliable Wide-Area WDM-PON Using Wavelength-Shifted Protection Scheme," Access Network Service Systems Laboratories, NTT Corporation; 2 pages, Sep. 25, 2005.

ITU—Telecommunication Standardization Sector Study Group 15; "Recommendation G.983.5; A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks," Department of Information Engineering, The Chinese University of Hong Kong, 2004 Optical Society of America, 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7, Jul. 2006.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Palacharla et al., "System and Method for Managing Network Components in a Hybrid Passive Optical Network," U.S. Appl. No. 11/552,696, filed Oct. 25, 2006, 43 pages, 4 drawings.

Bouda, "System and Method for Transmitting Upstream Traffic in an Optical Network," U.S. Appl. No. 11/426,875, filed Jun. 27, 2006, 49 pages, 5 drawings.

Bouda, "System and Method for Transmitting Traffic in a Plurality of Passive Optical Networks," U.S. Appl. No. 11/627,809, filed Jan. 26, 2007, 35 pages, 5 drawings.

Bouda, "System and Method for Managing Different Transmission Architectures in a Passive Optical Network," U.S. Appl. No. 11/627,793, 42 pages, 4 drawings, Jan. 26, 2007.

Bouda, "System and Method for Distributing Traffic in an Optical Network," U.S. Appl. No. 11/426,879, filed Jun. 27, 2006, 43 pages, 5 drawings.

Akasaka et al., "System and Method for Traffic Distribution in an Optical Network," U.S. Appl. No. 11/426,884, filed Jun. 27, 2006, 71 pages, 12 drawings.

Bouda et al., "Method and System for Increasing Downstream Bandwidth in an Optical Network," U.S. Appl. No. 11/620,144, filed Jan. 5, 2007, 42 pages, 10 drawings.

Bouda, "Distribution Node for an Optical Network," U.S. Appl. No. 11/619,945, filed Jan. 4, 2007, 38 pages, 6 drawings.

Akasaka et al., "System and Method for Protecting an Optical Network," U.S. Appl. No. 11/609,120, filed Dec. 11, 2006, 42 pages, 4 drawings.

Bouda et al., "System and Method for Extending Reach in a Passive Optical Network," U.S. Appl. No. 11/669,657, filed Jan. 31, 2007, 51 pages, 5 drawings.

Bouda, "System and Method for Transmitting Optical Markers in a Passive Optical Network System," U.S. Appl. No. 11/669,677, filed Jan. 31, 2007, 52 pages, 5 drawings.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

Green, Paul E., Jr., *Fiber-to-the-Home White Paper*, 21 pgs., Feb. 21, 2003.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

Son, et al., *Bidirectional WDM Passive Optical Network for Simultaneous Transmission of Data and Digital Broadcast Video Service, Journal of Lightwave Technology*, vol. 21, No. 8, © 2003 IEEE, pp. 1723-1727, Aug. 2003.

Ching, et al., *Passive Optical Networks, Sharing the Fiber*, Merrill Lynch & Co. (27 pages), May 15, 2001.

Kuhlow, et al., *AWG-Based Device for a WDM Overlay PON in the 1.5-µm Bank, IEEE Photonics Technology Letters*, vol. 11, No. 2, © 1999 IEEE, pp. 218-220, Feb. 1999.

Feldman, et al., *An Evaluation of Architectures Incorporating Wavelength Division Multiplexing for Broad-Bank Fiber Access, Journal of Lightwave Technology*, vol. 16, No. 9, © 1998 IEEE, pp. 1546-1559, Sep. 1998.

Giles, et al., *Access PON Using Downstream 1550-nm WDM Routing and Upstream 1300-nm SCMA Combining Through a Fiber-Grating Router, IEEE Photonics Technology Letters*, vol. 8, No. 11, © 1996 IEEE, pp. 1549-1551, Nov. 1996.

Hilbk, et al., *High Capacity WDM Overlay on a Passive Optical Network, Electronics Letters*, vol. 32, No. 23, pp. 2162-2163, Nov. 7, 1996.

Inoue, et al., *Silica-based Arrayed-Waveguide Grating Circuit as Optical Splitter/Router, Electronics Letters*, vol. 31, No. 9, pp. 726-727, Apr. 27, 1995.

Kashima, *Upgrade of Passive Optical Subscriber Network, Journal of Lightwave Technology*, vol. 9, No. 1, © 1991 IEEE, pp. 113-120, Jan. 1991.

Lin, *Passive Optical Subscriber Loops with Multiaccess, Journal of Lightwave Technology*, vol. 7, No. 11, © 1989 IEEE, pp. 1769-1777, Nov. 1989.

(Mems)* Singlemode Fiber Optic Switch, FO5935, MOOG Components Group (2 pages), © 2005.

PON & FTTx Update, *Light Reading*, (11 pages), Aug. 8, 2005.

ITU-T Telecommunication Standardization Sector of ITU, G.984.1, Series G: Transmission Systems and Media, Digital Systems and Networks, Digital sections and digital line system—Optical line system for local and access networks, *Gigabit-capable Passive Optical Networks (GPON): General Characteristics*. (20 pages), Mar. 2003.

ITU-T Telecommunication Standardization Sector of ITU, G.983.1, Series G: Transmission Systems and Media, Digital Systems and Networks, Digital sections and digital line system—Optical line system for local and access networks, *Broadband Optical Access Systems Based on Passive Optical Networks* (117 pages), Jan. 2005.

ITU-T Telecommunication Standardization Sector of ITU, G.983.3, Series G: Transmission Systems and Media, Digital Systems and Networks, Digital sections and digital line system—Optical line system for local and access networks, *A Broadband Optical Access Systems with Increased Service Capability by Wavelength Allocation* (52 pages), Mar. 2001).

Bouda, *A Distribution Node for a Wavelength-Sharing Network*, patent application, U.S. Appl. No. 11/347,612, Pending, filed Feb. 3, 2006.

Bouda, et al., *Distribution Components for a Wavelength-Sharing Network*, patent application, U.S. Appl. No. 11/347,585, Pending, filed Feb. 3, 2006.

Bouda, et al., *Upgradeable Passive Optical Network*, patent application, U.S. Appl. No. 11/347,446, Pending, filed Feb. 3, 2006.

* cited by examiner

2

HYBRID PASSIVE OPTICAL NETWORK USING SHARED WAVELENGTHS

CROSS-REFERENCE TO RELATED APPLICATION

This application claims the benefit of priority under 35 U.S.C. § 119(e) of U.S. Provisional Application entitled "Passive Optical Network using Shared Wavelengths," Ser. No. 60/729,447 filed Oct. 20, 2005, and of U.S. Provisional Application entitled "Hybrid Passive Optical Network Components," Ser. No. 60/756,925 filed Jan. 6, 2006.

TECHNICAL FIELD OF THE INVENTION

The present invention relates generally to optical networks and, more particularly, to a hybrid passive optical network using shared wavelengths.

BACKGROUND

In recent years, a bottlenecking of communication networks has occurred in the portion of the network known as the access network. Bandwidth on longhaul optical networks has increased sharply through new technologies such as WDM and transmission of traffic at greater bit rates. Metropolitan-area networks have also seen a dramatic increase in bandwidth. However, the access network, also known as the last mile of the communications infrastructure connecting a carrier's central office to a residential or commercial customer site, has remained at a relative standstill in terms of affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). An ONU refers to a form of access node that converts optical signals transmitted via fiber to electrical signals that can be transmitted to individual subscribers. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (GB/s) by using more powerful transmitters, providing even greater bandwidth. Other PSPONs include, for example, asynchronous transfer mode PONs (APONs) and gigabit Ethernet PONs (GEPONs).

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. Thus, a need exists for an access network that provides even greater bandwidth.

Another solution to the present bottlenecking issue that would also satisfy demand for bandwidth for many years to come is using wavelength division multiplexing passive optical networks (WDMPONs). These networks comprise access networks in which each ONU receives and transmits traffic over a dedicated downstream and upstream wavelength, respectively. By transmitting traffic over dedicated wavelengths, WDMPONs dramatically increase network capacity over existing networks (including typical PSPONs). However, WDMPONs tend to be very expensive compared to PSPONs, the technological risks of deployment of WDMPONs are very high, and WDMPONs provide much more bandwidth than is presently demanded.

SUMMARY

In accordance with the teachings of the present invention, a hybrid passive optical network using shared wavelengths is provided. In a particular embodiment, a system for communicating optical signals over a network includes an upstream terminal. The upstream terminal includes a signal source operable to transmit a downstream signal comprising at least traffic in a first wavelength and traffic in a second wavelength. The upstream terminal is operable to receive upstream traffic in a third wavelength, wherein the third wavelength is shared by a first plurality of downstream terminals and a second plurality of downstream terminals. The system also includes a distribution node comprising a wavelength router. The wavelength router is operable to receive the downstream signal, route the traffic in the first wavelength to the first plurality of downstream terminals, and route the traffic in the second wavelength to the second plurality of downstream terminals.

Technical advantages of one or more embodiments of the present invention may include providing a cost-effective, upgrade path from Power Splitting Passive Optical Networks (PSPONs), such as APONs, BPONs, GPONs, and GEPONs, to WDMPONs. Particular embodiments may provide a passive optical network with more downstream bandwidth than a typical PSPON yet avoid the cost and unreliability of WDMPONs by using a more cost-efficient variation of WDMPON features and components for transmission in the downstream direction. In these embodiments, groups of ONUs may share one or more of the downstream WDM wavelengths (instead of each ONU receiving a dedicated wavelength), allowing for relatively coarse (and thus less expensive) wavelength multiplexing optics in the passive distribution network. A group of ONUs may comprise less than all of the ONUs corresponding to one OLT.

Particular embodiments may further avoid the cost of WDMPONs by providing PSPON features and components for transmissions in the upstream direction. These embodiments may allow full re-use of typical optical components at each ONU. By reusing optical components, these embodiments may avoid the cost of new equipment and labor at the time of upgrade.

Particular embodiments may further avoid the cost of WDMPONs by providing a wavelength router comprising a filter system as opposed to a wavelength router comprising a multiplexer. For example, particular embodiments provide a cascaded filter system. Using cascaded filters and avoiding the use of a costly multiplexer to route downstream wavelengths may provide for a less costly network.

Another technical advantage of particular embodiments of the present invention includes providing efficient power budgeting between the signals that are to be split for broadcast to all ONUs and the signals that are to be routed to wavelength-sharing ONUs. These embodiments may manage the power efficiently by allowing the broadcast signals to receive more power than the routed signals. Thus, the signals in need of more power are allotted more power.

Another technical advantage of particular embodiments of the present invention includes increasing the number of wavelengths available to carry traffic by disabling the analog video distribution system typically provided in PSPONs and multiplex a number of digital data signals in the wavelength range around and including the band originally assigned for analog video broadcast. Particular embodiments may transmit traffic in other bands as well.

Another technical advantage of particular embodiments of the present invention includes providing for an easily upgradeable PSPON. In particular embodiments, configuring a PSPON to include components such as filters coupled to the network through switches may facilitate an upgrade of the PSPON.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which:

FIGS. 11A and 11B are diagrams illustrating example components for switching a filter in or out of the line during a network upgrade.

DETAILED DESCRIPTION

Figure 1:
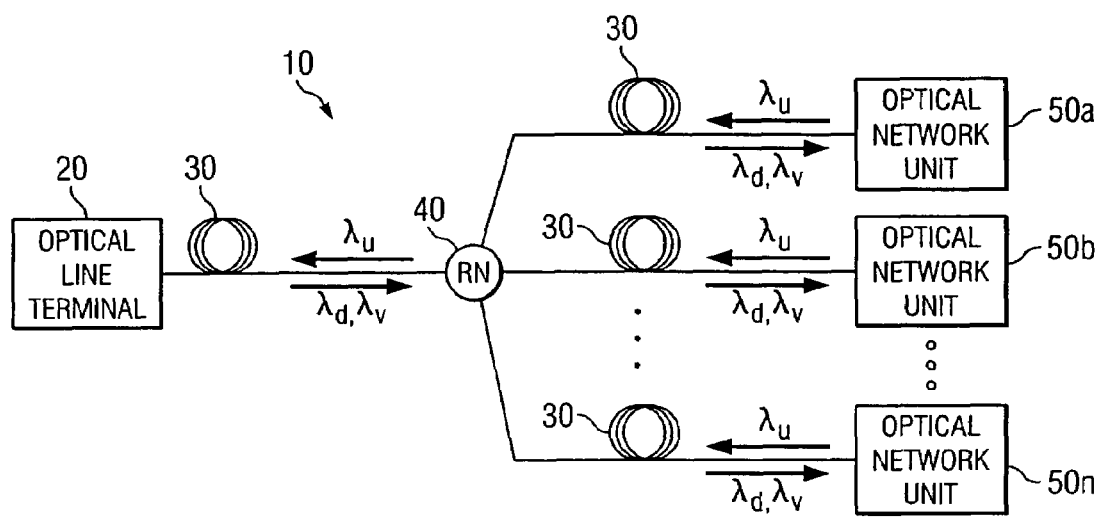
FIG. 1 is a diagram illustrating an example power splitting PON (PSPON)

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, BPONs are currently being deployed to provide hundreds of megabits per second capacity shared by thirty-two users. GPONs, which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a broadband PON (BPON), a gigabit PON (GPON), a gigabit Ethernet PON (GEPON), or any other suitable PSPON. A feature common to all PSPONs 10 is that the outside fiber plant is completely passive.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal).

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. In the past, network operators have met increased demand by increasing the transmission rate of transmitters, such as, for example, by upgrading from BPONs to GPONs. However, a switch to a wavelength division multiplexing PON (WDMPON), in which each ONU would receive and transmit traffic over a dedicated downstream and upstream wavelength, respectively, would dramatically increase network capacity and satisfy the demand for bandwidth for many years to come.

Figure 2:
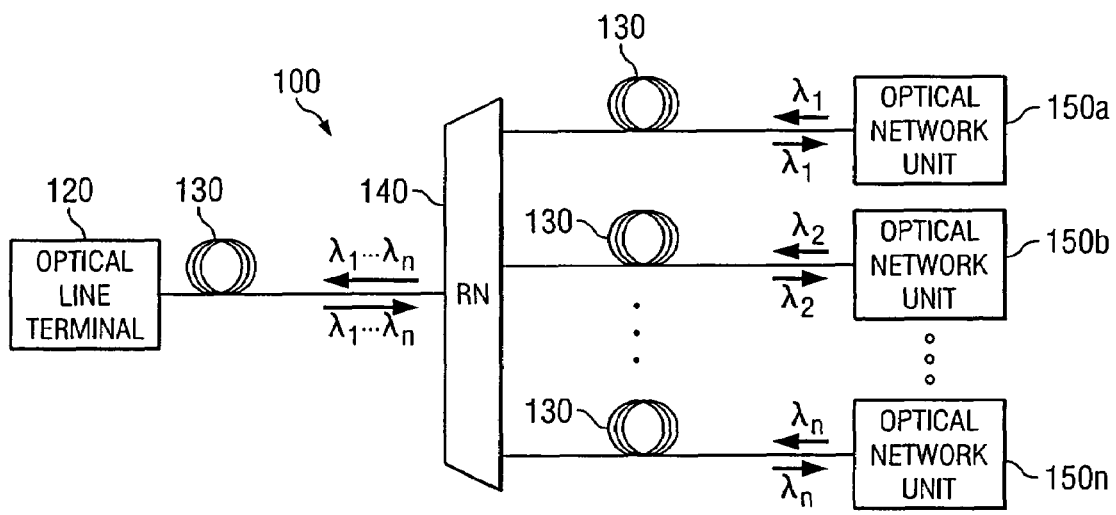
FIG. 2 is a diagram illustrating an example WDMPON.

FIG. 2 is a diagram illustrating an example WDMPON 100. WDMPON 100 may include any suitable WDMPON (also referred to as WPON) or Dense WDMPON (DWDMPON). WDMPON 100 includes OLT 120, optical fiber 130, RN 140, and ONUs 150. Common features of WDMPONs include dedicating at least one upstream and one downstream wavelength for each ONU. Thus, WDMPONs are operable to transmit downstream traffic over multiple, dedicated wavelengths from an OLT, each wavelength corresponding to a particular ONU. In addition, each ONU is operable to transmit upstream traffic over a dedicated wavelength, separate from the wavelengths used by the other ONUs 150. Thus, the upstream and downstream bandwidth of WDMPON 100 is N times greater than the bandwidth of a PSPON, where N equals the number of dedicated wavelengths over which traffic is carried in each direction.

Referring back to FIG. 2, OLT 120 of example WDMPON 100 may reside at the carrier's central office and includes multiple transmitters (equal to the number of. ONUs 150), each operable to transmit a dedicated downstream wavelength, one of $\lambda_1$-$\lambda_n$ carrying traffic for a corresponding ONU 150. OLT 120 also includes multiple receivers (equal to the number of ONUs 150), each operable to receive a dedicated upstream wavelength, one of $\lambda_1$-$\lambda_n$, carrying traffic from a corresponding ONU 150. OLT 120 also includes a multiplexer operable to multiplex the downstream wavelengths transmitted by the transmitters of OLT 120 and demultiplex the upstream signal (comprising traffic in multiple wavelengths) that OLT 120 receives from ONUs 150. After demultiplexing the signal, the multiplexer is operable to forward the traffic in each wavelength to a corresponding receiver in OLT 120. It should be noted that $\lambda_1$-$\lambda_n$ in the downstream direction may (or may not) be transmitted at the same wavelengths as $\lambda_1$-$\lambda_n$ traveling upstream (despite having similar designation for simplicity of this discussion).

Optical fiber 130 may include any suitable fiber and is operable to carry upstream and downstream traffic. In certain WDMPONs 100, optical fiber 130 may comprise, for example, bidirectional optical fiber. In other WDMPONs 100, optical fiber 130 may comprise two distinct fibers. RN 140 of WDMPON 100 comprises any suitable multiplexer and connects OLT 120 to ONUs 150. RN 140 is located in any suitable location and has one port to receive a downstream signal comprising multiple wavelengths from OLT 120 and multiple ports (equal to the number of ONUs 150) to forward traffic in each wavelength to a corresponding ONU. RN 140 is operable to demultiplex a downstream signal such that each ONU 150 receives traffic over its dedicated downstream wavelength, one of $\lambda_1$-$\lambda_n$. RN 140 is also operable to multiplex upstream traffic carried over $\lambda_1$-$\lambda_n$ into a single upstream signal, the traffic in each wavelength corresponding to one ONU 150. RN 140 is operable to forward the upstream signal to OLT 120.

ONUs 150 may include any suitable optical network unit or ONT and may serve residential and/or commercial customers. Each ONU 150 comprises one receiver to receive downstream traffic over its dedicated downstream wavelength from OLT 120. Each ONU 150 also comprises one transmitter to transmit upstream traffic over its dedicated upstream wavelength. Each ONU 150 may be capable of transmitting and receiving traffic in any wavelength used in WDMPON 100 such that the wavelengths assigned to the various ONUs may be changed without having to change the transmitting and receiving components in the ONUs. An ONU capable of operating in this fashion is typically referred to as a "colorless" ONU.

In operation, each transmitter in OLT 120 transmits downstream traffic for a corresponding ONU 150 over a dedicated wavelength, a corresponding one of $\lambda_1$-$\lambda_n$. The downstream wavelengths are multiplexed at OLT 150 into one signal, and the signal travels over optical fiber 130 to RN 140. RN 140 receives the signal and demultiplexes the signal into its constituent wavelengths, forwarding the traffic in each wavelength to a corresponding ONU 150. Each ONU 150 receives traffic over the associated wavelength and processes the traffic. Each ONU 150 may also transmit upstream traffic over a dedicated wavelength, one of $\lambda_1$-$\lambda_n$, along fiber 130. RN 140 receives upstream traffic from all of the ONUs 150 carried over these dedicated wavelengths and multiplexes the traffic from all of the ONUs 150 into one signal. RN 140 forwards the signal over fiber 130 to OLT 120. OLT 120 receives the signal and demultiplexes it into its constituent wavelengths. The demultiplexer of OLT 120 forwards the traffic in each wavelength to a corresponding receiver, and OLT 120 processes the traffic.

As is easily observed in the WDMPON 100 of FIG. 2, WDMPONs dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

In addition to these high costs, replacing current networks with WDMPONs would also inefficiently increase network capacity beyond present needs. In fact, WDMPONs are expected to exceed demand for many years. Thus, many network operators would prefer to make gradual upgrades from existing networks, such that increases in bandwidth (and thus the cost of such increases) correspond more closely with increases in consumer demand. These operators may eventually upgrade to a WDMPON after one or more intermediary upgrades, thereby incurring the cost of WDMPON bandwidth over a greater period of time and according to consumer demand.

Figure 3:
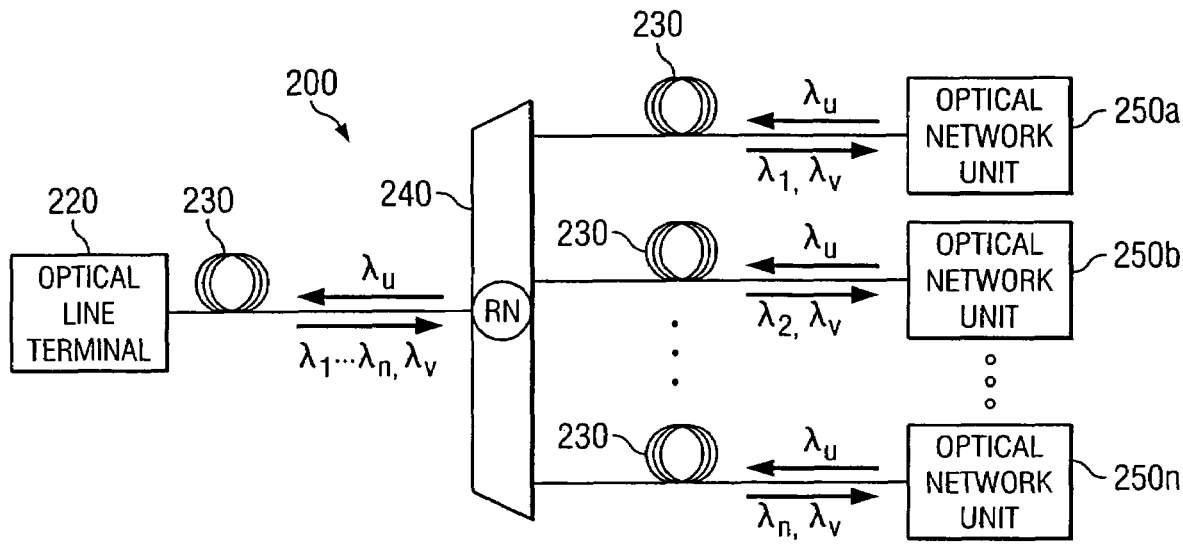
FIG. 3 is a diagram illustrating an example Hybrid PON with WDM downstream overlay (WDMDO-HPON)

FIG. 3 is a diagram illustrating an example Hybrid PON 200 with WDM downstream overlay (WDMDO-HPON). WDMDO-HPON 200 addresses the limited capacity issues associated with PSPONs and some of the cost issues associated with WDMPONs by providing WDMPON capabilities downstream and PSPON capabilities upstream, thus eliminating the cost and unreliability of colorless transmitters at the ONUs. Example WDMDO-HPON 200 may thus be considered a hybrid PON (or HPON) between a PSPON and a WDMPON.

WDMDO-HPON 200 includes an OLT 220, fiber 230, RN 240, and ONUs 250. WDMDO-HPON 200 provides WDM-PON capabilities downstream by using a dedicated wavelength, one of $\lambda_1$-$\lambda_n$, for each ONU 250. WDMDO-HPON 200 provides PSPON capabilities upstream by using one wavelength, $\lambda_u$, time-shared by all ONUs 250.

OLT 220 of WDMDO-HPON 200 (which may be an example of an upstream terminal) may reside at the carrier's central office and includes multiple transmitters (equal to the number of ONUs 250), each operable to transmit traffic in a dedicated downstream wavelength, one of $\lambda_1$-$\lambda_n$, carrying traffic for a corresponding ONU 250. As in the case of GPONs, OLT 220 may also include an additional transmitter to transmit analog video traffic in $\lambda_v$ for broadcast to all ONUs 250. OLT 220 includes a multiplexer operable to multiplex the traffic in the wavelengths transmitted by the multiple transmitters of OLT 220. OLT 220 also includes a receiver operable to receive the traffic in the upstream wavelength, $\lambda_u$, which is time-shared by ONUs 250.

Optical fiber 230 may include any suitable fiber to carry upstream and downstream traffic. In certain WDMDO-HPONs 200, optical fiber 230 may comprise, for example, bidirectional optical fiber. In other WDMDO-HPONs 200, optical fiber 230 may comprise two distinct fibers.

RN 240 of WDMDO-HPON 200 comprises a multiplexer and a power splitter. The multiplexer is operable to demultiplex dedicated wavelengths $\lambda_1$-$\lambda_n$ and forward traffic in each wavelength, one of $\lambda_1$-$\lambda_n$, to a corresponding ONU 250. The power splitter is operable to receive and split traffic in downstream wavelength $\lambda_v$ (if applicable) for broadcast to all ONUs 250. With regard to upstream traffic, the power splitter of RN 240 is further operable to receive and combine the traffic transmitted in time-shared $\lambda_u$ from ONUs 250 into one signal. RN 240 is further operable to forward the upstream signal to OLT 220.

ONUs 250 (which may be examples of downstream terminals) may include any suitable optical network unit or ONT and may serve residential and/or commercial customers. There may be any suitable number of ONUs, such as, for example, the typical thirty-two ONUs per OLT. Each ONU 250 comprises one receiver to receive traffic over a dedicated downstream wavelength, one of $\lambda_1$-$\lambda_n$, and one receiver to receive traffic over $\lambda_v$ (if applicable). Each ONU 250 also comprises one transmitter to transmit upstream traffic over time-shared $\lambda_u$. Each ONU 250 may thus include a triplexer.

In operation, each transmitter in OLT 220 transmits downstream traffic for a corresponding ONU 250 over a dedicated wavelength, one of $\lambda_1$-$\lambda_n$, and (in certain cases) one transmitter transmits downstream traffic to be broadcast to all ONUs 250 over $\lambda_v$. Wavelengths $\lambda_1$-$\lambda_n$ and $\lambda_v$ are multiplexed at OLT 220 into one signal, and the signal travels over optical fiber 230 to RN 240. RN 240 filters the traffic in $\lambda_v$ out of the signal and forwards this wavelength to the power splitter where it is split for broadcast to all ONUs 250. At the multiplexer, RN 240 demultiplexes the signal comprising the remaining wavelengths ($\lambda_1$-$\lambda_n$) and forwards the traffic in each wavelength, one of $\lambda_1$-$\lambda_n$, to its corresponding ONU 250. Each ONU 250 receives traffic over its dedicated wavelength and processes the traffic. Each ONU 250 may also receive and process traffic over $\lambda_v$. In the upstream direction, each ONU 250 time-shares use of $\lambda_u$ according to a suitable protocol. RN 240 receives the time-shared upstream traffic carried over $\lambda_u$, from each of the ONUs 250 and combines the traffic into one signal using the power splitter. RN 240 forwards the combined signal over fiber 230 to OLT 220. OLT 220 receives the signal at its receiver and processes the traffic.

Although WDMDO-HPON 200 of FIG. 3 offers a compromise between limited bandwidth PSPONs and costly WDM-PONs, several undesirable features remain in WDMDO-HPONs. For example, WDMDO-HPONs are significantly expensive due to the costly components necessary to transmit and multiplex large numbers of wavelengths. As in the case of WDMPONs, WDMDO-HPONs require highly stable WDM components to distribute narrowly spaced dedicated wavelengths from the OLT to each ONU. In practice, the density of the channels requires wavelength stabilized transmitters and temperature insensitive multiplexers, both of which add significantly to the cost of the network. In addition to these high costs, replacing current networks with WDMDO-HPONs would also inefficiently increase network capacity beyond present needs. Thus, a need exists for an HPON that offers a simple and efficient upgrade from existing PSPONs and that may easily and efficiently be upgraded (to, for example, a WDMPON).

Figure 4:
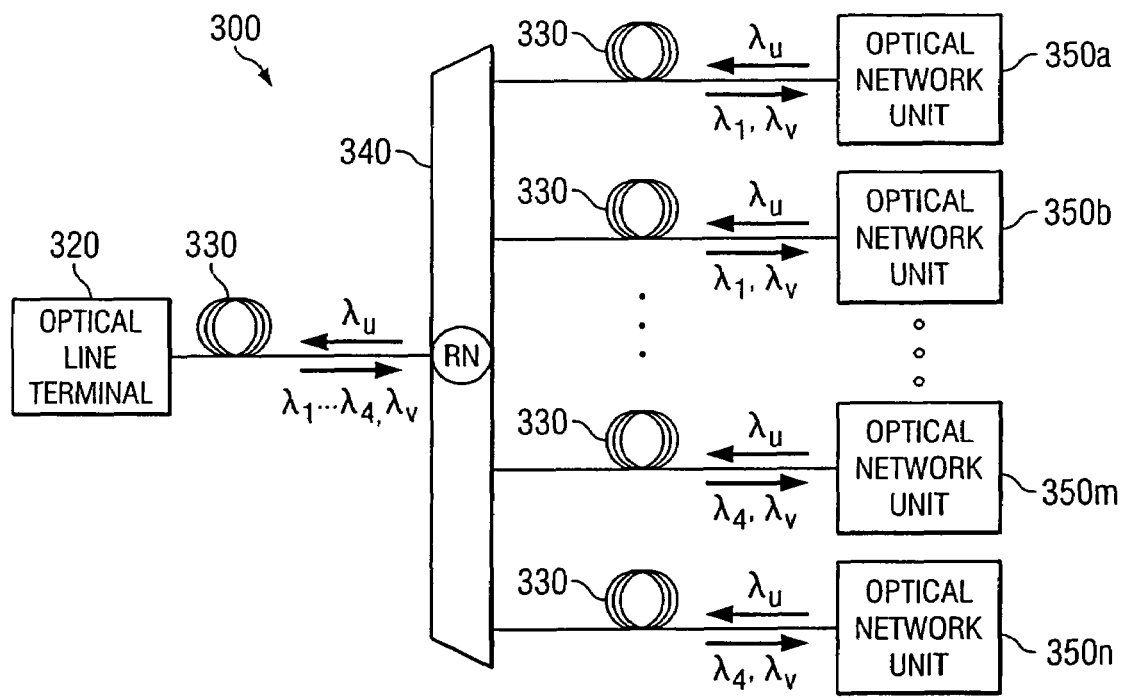
FIG. 4 is a diagram illustrating an example Wavelength Shared Hybrid PON (WS-HPON)

FIG. 4 is a diagram illustrating an example Wavelength Shared Hybrid PON (WS-HPON) 300. Example WS-HPON 300 comprises OLT 320, optical fiber 330, RN 340, and ONUs 350. Example WS-HPON 300, a hybrid between a PSPON and a WDMPON, provides a more cost-efficient upgrade solution (than a WDMDO-HPON solution) for many network operators. Example WS-HPON 300 provides greater downstream capacity without incurring many of the costs of WDMDO-HPON by having groups of two or more ONUs 350 share downstream WDM wavelengths, thus reducing the need for densely multiplexed wavelengths and the need for highly stable multiplexers and transceivers.

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a WS-HPON. Using shared wavelengths in WS-HPON permits the use of less costly optics components (such as, for example, low-cost CWDM optics), allowing for an upgrade in capacity at a lower cost than WDMDO-HPON or WDMPON.

For example, sharing downstream wavelengths in WS-HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, WS-HPON 300 is a much more attractive upgrade solution for many network operators than is WDMDO-HPON 200. In addition, WS-HPON 300 is also upgradeable to WDMPON, as described below, allowing migration to WDMPON if and when there is sufficient demand to justify the cost for the increase in bandwidth.

OLT 320 of WS-HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 (including traffic in multiple sub-bands of $\lambda_u$) and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain WS-HPONs 300, optical fiber 330 may comprise, for example, bidirectional fiber. In other WS-HPONs 300, optical fiber 330 may comprise two distinct fibers.

RN 340 of WS-HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 230 to OLT 220. OLT 220 receives the signal at its receiver and processes the traffic.

Modifications, additions, or omissions may be made to the WS-HPON 300 described without departing from the scope of the invention. The components of the WS-HPON 300 described may be integrated or separated according to particular needs. Moreover, the operations of the WS-HPON 300 described may be performed by more, fewer, or other components.

Referring back to the discussion of PSPONs, PSPONs may transmit downstream traffic over two wavelengths $\lambda_d$ and $\lambda_v$, and upstream traffic over time-shared wavelength $\lambda_u$. Many typical PSPONs are not easily upgradeable to an HPON, such as example WDMDO-HPON 200 or WS-HPON 300. Upgrades of typical PSPONs to HPONs require a disruption in service. For example, in existing PSPONs, fiber cuts are required to add or modify components, disrupting service in existing networks. Thus, a need exists for an easily upgradeable PSPON.

Figure 5:
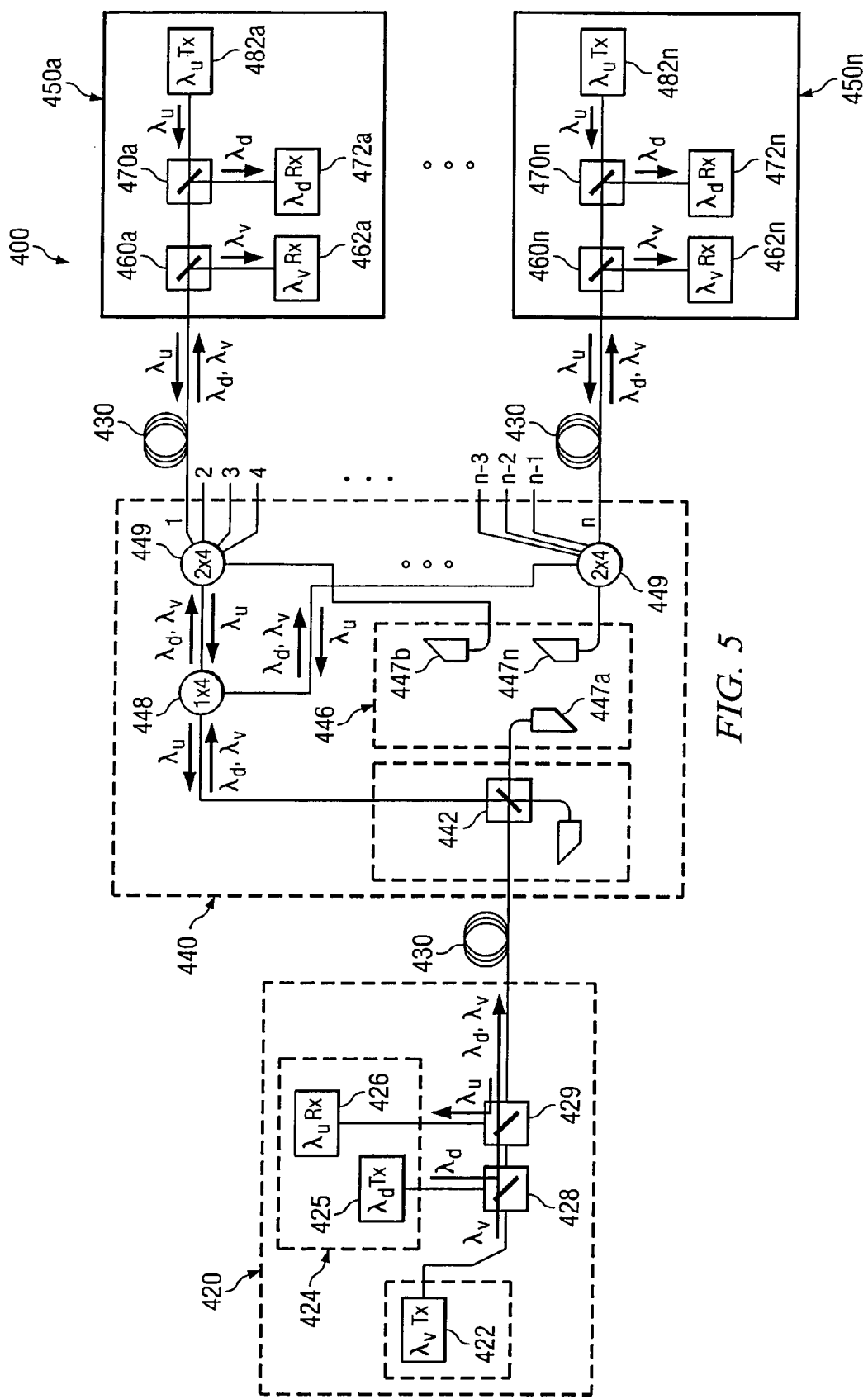
FIG. 5 is a diagram illustrating an example upgradeable PSPON.

FIG. 5 is a diagram illustrating an example upgradeable PSPON 400. Example PSPON 400 comprises OLT 420, optical fiber 430, RN 440, and ONUs 450. The upgradeability of upgradeable PSPON 400 may be provided for any PSPON such as those described above in conjunction with PSPON 10 of FIG. 1

OLT 420 of example upgradeable PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in $\lambda_v$ and direct the traffic in $\lambda_d$ to RN 440. The traffic in $\lambda_d$ and $\lambda_v$ may also be combined into one signal at filter 428. Filter 429 comprises any suitable filter operable to pass the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example upgradeable PSPON 400, optical fiber 430 may comprise bidirectional optical fiber. Alternatively, optical fiber 430 may comprise one fiber for downstream traffic and one fiber for upstream traffic.

RN 440 comprises a filter 442, a lead termination section 446, a primary power splitter 448, and secondary power splitters 449. RN 440 is configured to be easily upgraded to implement a WS-HPON and, eventually, a WDMPON. Filter 442 comprises any suitable filter and may include, for example, a band splitting filter. Filter 442 is operable to direct the traffic in downstream wavelengths that are to be split and broadcast by primary power splitter 448 and pass the traffic in downstream wavelengths that are to be demultiplexed (once the system is upgraded to a WS-HPON). Filter 442 is also operable to direct the traffic in upstream wavelengths to OLT 420. Before an upgrade from a PSPON, filter 442 directs the traffic in $\lambda_d$ and $\lambda_v$ to primary power splitter 448 for broadcast, and directs the traffic in $\lambda_u$ from primary power splitter 448 to OLT 420. Filter 442 may be coupled to a termination point that may terminate the traffic in wavelengths forwarded to it by filter 442 (although the termination point may be internal to filter 442 in alternate example networks). Although the illustrated example includes only one filter 442, example upgradeable PSPONs may comprise any suitable number of filters (and optional switches) to seamlessly upgrade the network. An example of a set of filters and switches at an RN is described below in conjunction with FIGS. 12A-12D.

Lead termination section 446 of RN 440 allows for an easy upgrade of network 400 by inserting a wavelength router such as a multiplexer for performing WDM. Lead termination section 446 comprises a plurality of fiber leads. One input fiber lead 447a is coupled to filter 442, and multiple output fiber leads 447b-447n are coupled to corresponding secondary power splitters 449. Before an upgrade, leads 447a-447n of lead termination section 446 may be configured such that they terminate any signal that they may receive. After an upgrade, leads 447a-447n may be coupled to corresponding multiplexer ports, allowing for easy integration of a multiplexer (to perform WDM) into the network, as described in more detail below in conjunction with FIG. 6. There may be any suitable number of leads in network 400.

Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420. A wavelength router and a power splitter may each be members of a group referred to as distributors.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450 (in addition, after upgrade to WS-HPON, secondary power splitters 449 serve to combine signals received from primary power splitter 448 and from the multiplexer inserted into lead termination section 446, as described below, and to distribute this combined signal to ONUs 450). Pre-upgrade, secondary power splitters 449 only receive a signal from primary power splitter 448 and do not receive a signal from lead termination section 446. After a multiplexer is added to the network, however, secondary power splitters 449 may receive a signal from primary power splitter 448 and the multiplexer (coupled to lead termination section 446). In the upstream direction, each secondary power splitter 449 is operable to receive and combine traffic over time-shared $\lambda_u$ from a corresponding group of ONUs 450, split the combined traffic into two copies, and distribute one copy to lead termination section 446 and one copy to primary power splitter 448. In the illustrated example, the copy passed to lead termination section 446 is terminated, and the copy passed to primary power splitter 448 is combined with other upstream signals (from the other secondary power splitters 449) and forwarded to filter 442. It should be noted that although secondary power splitters 449 are represented by 2×4 couplers in the illustrated example, any suitable couplet (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. Each filter 460 may comprise any suitable filter operable to direct traffic in $\lambda_v$ to a corresponding receiver 462 and to pass traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to pass the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and passes the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to pass over fiber 430 to filter 442 of RN 440. Filter 442 receives the signal comprising the traffic in $\lambda_d$ and $\lambda_v$ and directs the traffic in both wavelengths to primary power splitter 448. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and passes each additional copy over fiber 430 to a corresponding ONU 450. Each ONU 450 receives a copy of the signal comprising the traffic in $\lambda_d$ and $\lambda_v$ at a corresponding filter 460. Each filter 460 passes the traffic in $\lambda_d$ to filter 470 and directs the traffic in $\lambda_v$ to receiver 462. Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ passes through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to lead termination section 446 and the other copy to primary power splitter 448. Lead termination section 446 receives a copy of the traffic in $\lambda_u$ from each secondary power splitter 449 and terminates the traffic. Primary power splitter 448 receives a copy of the upstream signal from each secondary power splitter 449, combines the signals into one signal, and forwards the combined signal to filter 442. Filter 442 receives the signal comprising the traffic in $\lambda_u$, and directs the signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Therefore, PSPON 400 operates similarly to PSPON 10 (in that both broadcast downstream signals and time-share an upstream signal). However, unlike PSPON 10, PSPON 400 allows for an easy upgrade to a WS-HPON. The optical fiber connecting OLT 420 and ONTs 450 need not be cut to perform this upgrade (thereby avoiding network downtime and the risk of contamination of connectors), and the upgrade to a multiplexer at RN 440 and to multiple transmitters and a multiplexer at OLT 420 may be performed almost completely in-service.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 6:
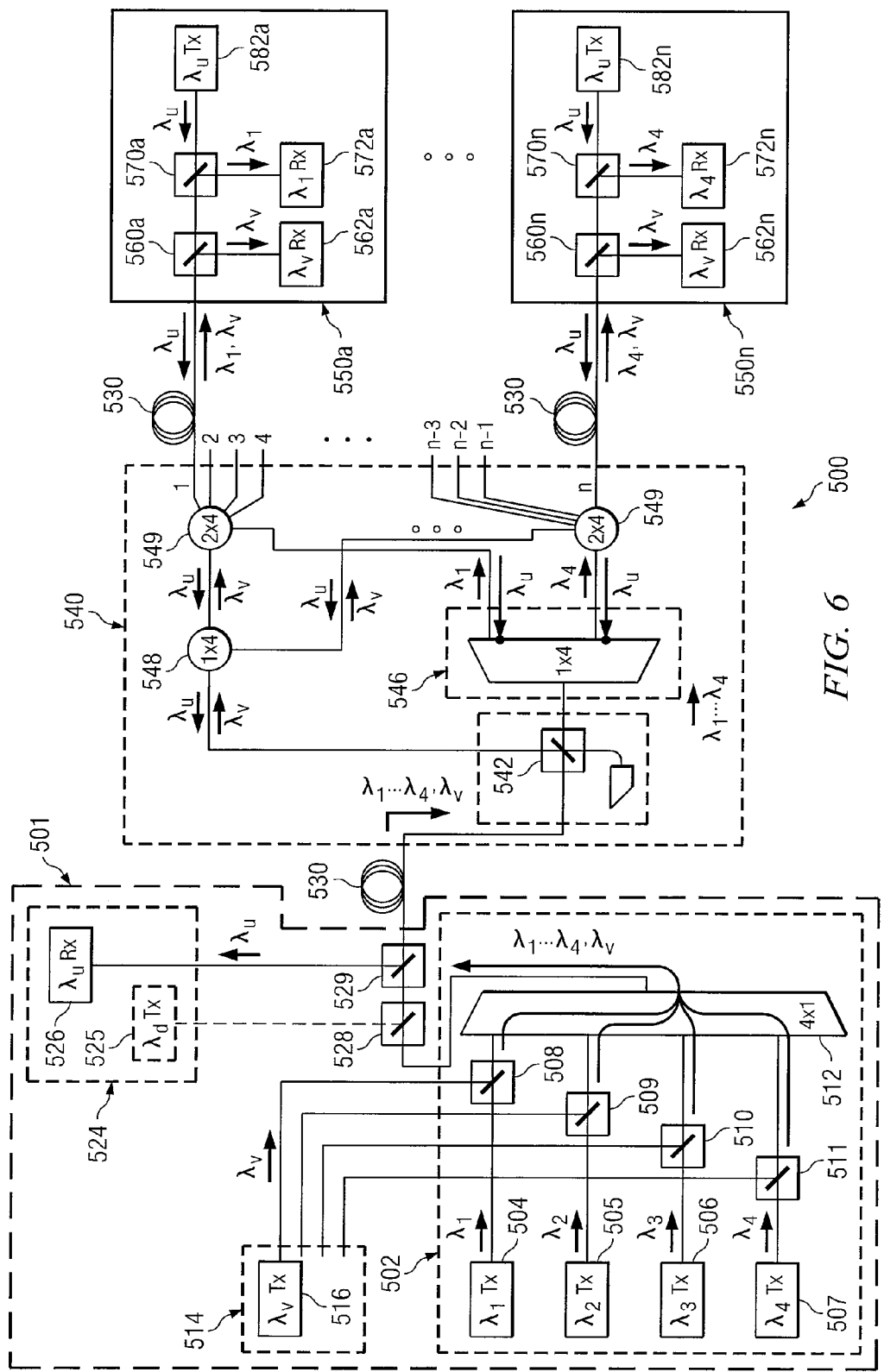
FIG. 6 is a diagram illustrating in more detail the example WS-HPON of FIG. 4.

FIG. 6 is a diagram illustrating in more detail the example WS-HPON of FIG. 4. The example WS-HPON 500 of FIG. 6 also illustrates an upgrade from upgradeable PSPON 400 of FIG. 5. As described above, WS-HPONs may be more attractive upgrade options than WDMDO-HPONs or WDMPONs. By sharing downstream WDM wavelengths, WS-HPONs provide an increase in bandwidth over PSPONs at a much lower price than WDMDO-HPONs or WDMPONs.

WS-HPON 500 comprises OLT 501, fiber 530, RN 540, and ONUs 550. OLT 501 (which may be an example of an upstream terminal) comprises WDM transmission section 502, upgradeable transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example WS-HPON 500 does not provide WDM for upstream traffic, and thus new receivers are not needed in conjunction with new transmitters 504-507, it may be economical to implement transceivers (transmitter and receiver) in WDM transmission section 502 instead of only transmitters (in anticipation of a further upgrade to WDM upstream). The cost of transceivers is typically less than the cost of a separate transmitter and receiver, thus reducing the eventual overall cost to upgrade to a WDMPON. It should further be noted that although only four new transmitters are illustrated in example WS-HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of upgradeable transmission section 514 to multiplexer 512 (such that the traffic in both $\lambda_1$ and $\lambda_v$ is forwarded to multiplexer 512 over the same fiber). In fact, each filter 508-511 may be coupled to upgradeable transmission section 514 (through a corresponding fiber), allowing for an easy upgrade if more transmitters are added to WS-HPON 500, as described below in conjunction with FIG. 7. The fibers coupling filters 509-511 and upgradeable transmission section 514 do not carry a signal in the illustrated example WS-HPON 500 of FIG. 6, as no new transmitters have been added to upgradeable transmission section 514. However, filters 509-511 may be operable to direct the traffic in the corresponding wavelengths associated with potential transmitters added to upgradeable transmission section 514. After the upgrade, filters 509-511 would direct the traffic in the corresponding wavelength from upgradeable transmission section 514 in a similar manner as filter 508 directs the traffic in $\lambda_v$.

Upgradeable transmission section 514 comprises transmitter 516 and a set of three terminating fiber leads. Transmitter 516 comprises any suitable transmitter and is operable to transmit traffic over $\lambda_v$. Transmitter 516 may be the same as transmitter 422 of network 400, and thus $\lambda_v$ of WS-HPON 500 may be the same as $\lambda_v$ of network 400. Transmitter 516 may transmit analog video traffic over $\lambda_v$. The three terminating fiber leads may be coupled to new transmitters if new transmitters are added to upgrade example WS-HPON 500. As discussed above, each terminating lead is coupled to a corresponding filter, one of filters 509-511. It should be noted that although only three fiber leads are illustrated, any suitable number of leads may be added in anticipation of further upgrades of WS-HPON 500.

Multiplexer 512 comprises any suitable multiplexer/demultiplexer (and may be considered a wavelength router) and is operable to combine the traffic in $\lambda_1$-$\lambda_4$ and $\lambda_v$ into one signal. In the illustrated example 500, multiplexer 512 comprises a cyclic multiplexer operable to receive and combine the traffic in more than one wavelength through each port (such as the traffic in $\lambda_1$ and $\lambda_v$ through the first port). In other example networks, multiplexer 512 may be a typical N×1 multiplexer operable to receive only the traffic in one wavelength through each port. Where the traffic in a large number of wavelengths is being multiplexed, a cyclic multiplexer may prove more cost-efficient than a multiplexer having N ports. Furthermore, a cyclic multiplexer may not need to be replaced to add more ports (as with typical multiplexers) if more transmitters are added to the OLT to upgrade WS-HPON 500. For example, as described below in conjunction with FIG. 7, WS-HPON 500 may be upgraded to transmit traffic in eight downstream wavelengths, including $\lambda_1$-$\lambda_4$ and additional wavelengths $\lambda_5$-$\lambda_8$. In such an upgrade, cyclic multiplexer 512 need not be replaced to receive the traffic in the four additional wavelengths, as the multiplexer's first port may receive the traffic in $\lambda_1$ and $\lambda_5$, the second port may receive the traffic in $\lambda_2$ and $\lambda_6$, the third port may receive the traffic in $\lambda_3$ and $\lambda_7$, and the fourth port may receive the traffic in $\lambda_4$ and $\lambda_8$. In the contrasting situation in which non-cyclic multiplexers are used, a 4×1 multiplexer would need to be replaced by an 8×1 multiplexer to receive the traffic in the four additional wavelengths.

PSPON transceiver 524 comprises transmitter 525 and receiver 526. Transmitter 525 may be the same transmitter as transmitter 425 of FIG. 5. However, in WS-HPON 500 of FIG. 6, transmitter 525 may no longer transmit traffic over the network, and may be replaced by transmitters 504-507 of WDM transmission section 502. Transmitter 525 may, in particular embodiments, remain in place to provide limited protection for failure of the downstream WDM transmitters or to keep the network operational at lower bandwidth during particular upgrades of the network (such as, for example, an upgrade of the multiplexer in the RN). Receiver 526 of transceiver 524 may comprise any suitable receiver (and may be the same as receiver 426 of network 400) and is operable to receive upstream traffic carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in upgrades of WS-HPON 500 (such as the traffic in $\lambda_5$-$\lambda_8$ discussed in conjunction with FIG. 7 below). Although illustrated in-line in WS-HPON 500, in other example embodiments, filter 528 may be switched out of the line using a suitable switch (such as, for example, the switch illustrated in FIGS. 11A and 11B, described below).

Filter 529 comprises any suitable filter operable to pass the traffic in $\lambda_1$-$\lambda_4$ and $\lambda_v$ over fiber 530 to RN 540. Filter 528 may also be operable to pass traffic in additional wavelengths to be transmitted in upgrades of WS-HPON 500 (such as traffic in $\lambda_5$-$\lambda_8$ discussed in conjunction with FIG. 7 below). In addition, filter 529 is operable to direct traffic in upstream wavelength $\lambda_u$ to receiver 526.

Optical fiber 530 may comprise any suitable fiber to carry upstream and downstream traffic. In certain WS-HPONs 500, optical fiber 530 may comprise, for example, bidirectional optical fiber. In other WS-HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, WS-HPON 500 is operable to allow wavelength-sharing among groups of ONUs 550, thereby increasing network capacity while avoiding the costly components of a full downstream WDM network such as WDMDO-HPON or WDM-PON.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network (described below in conjunction with FIGS. 12A-12D). In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the illustrated example network, multiplexer 546 may comprise a cyclic multiplexer (in which each port is operable to carry traffic in more than one wavelength). In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths. It should be noted that to upgrade PSPON 400 to WS-HPON 500, multiplexer 546 may be added to the lead termination section 446 of upgradeable PSPON network 400 (with input lead 447a coupled to the multiplexer's input port and output leads 447b-447n coupled to the multiplexer's output ports).

In the upstream direction, multiplexer 546 may be operable to receive and terminate the traffic in $\lambda_u$, as ONUs 550 of example WS-HPON 500 time-share $\lambda_u$ (and do not transmit traffic over multiple upstream wavelengths). Alternatively, multiplexer 546 may forward this traffic to filter 542 for suitable termination (where termination may be performed internally or externally). However, if WS-HPON 500 is upgraded to provide WDM upstream, multiplexer 546 may be operable to receive traffic in multiple upstream wavelengths from ONUs 550 and multiplex the traffic in these wavelengths, forwarding them to OLT 501.

Primary power splitter 548 may comprise any suitable power splitter and may be primary power splitter 448 of network 400. In the illustrated example WS-HPON, primary power splitter 548 is operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example WS-HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT and may be the same as ONU 450 of FIG. 5. ONU 550 of FIG. 6 comprises a filter 560, receiver 562, filter 570, receiver 572, and transmitter 582. Each filter 560 may comprise any suitable filter and may be the same as filter 460 of network 400. Each filter 560 is operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver and may be the same as receiver 462 of network 400. Receiver 562 is operable to receive the traffic transmitted in $\lambda_v$ and process the traffic. Each filter 570 may comprise any suitable filter and may be the same as filter 470 of network 400. Each filter 570 is operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver and may be the same as receiver 472 of network 400. Receiver 572 is operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter and may be the same as transmitter 482 of network 400. Transmitter 582 is operable to transmit traffic over $\lambda_u$ in the upstream direction, applying a suitable protocol to time-share $\lambda_u$ with the other ONUs 550. It should be noted that although four ONUs are illustrated as being part of a group of ONUs in WS-HPON 500, any suitable number of ONUs may be part of a group sharing a downstream wavelength. In addition, there may be multiple groups each sharing a different a downstream wavelength (as is the case in the illustrated example). It should also be noted that any suitable number of ONUs 550 may be implemented in the network. It should further be noted that ONUs 550 may be adjusted in an alternative upgrade to transmit traffic over sub-bands of $\lambda_u$ (which may be combined by PS 548 of RN 540) to be received by receivers corresponding to transmitters 504-507 (in which case filter 529 would be taken out of the line). In an alternative upgrade, each group of ONUs sharing a wavelength may transmit upstream traffic in a separate wavelength (and multiplexer 546 may multiplex these wavelengths at the RN, and receivers 504-507 may receive these wavelengths).

In operation, transmitters 504-507 and (analog video) transmitter 516 of OLT 501 may transmit traffic over $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, WS-HPON 500 is configured to be easily upgraded to include additional transmitters at upgradeable transmission section 514 of OLT 501. After receiving the traffic in their corresponding wavelengths, filters 508-511 forward the corresponding signals to multiplexer 512. Multiplexer 512, which may include, for example, a cyclic multiplexer, combines the traffic in the five wavelengths into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_4$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 6, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_n$ and directs the traffic to receiver 572 which then processes the traffic. Again, since each ONU 550 in a group may share one of $\lambda_1$-$\lambda_4$ with other ONUs 550 in the group, ONUs 550 must apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 must adhere to a suitable protocol to time-share $\lambda_u$ such that traffic from multiple ONUs does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver. 526. Receiver 526 receives the traffic and processes it.

Modifications, additions, or omissions may be made to the example WS-HPON 500 described without departing from the scope of the invention. The components of the example WS-HPON 500 described may be integrated or separated according to particular needs. Moreover, the operations of the example WS-HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

As discussed above, WS-HPON 500 is an attractive PSPON upgrade for many network operators because it increases network capacity by introducing wavelength division multiplexing of downstream traffic without modifying ONUs 550, avoiding the cost of replacing components at each ONU and of creating substantial disruption in service. WS-HPON 500 is also a more attractive option than other HPONs such as WDMDO-HPON. By having groups of ONUs share downstream wavelengths, WS-HPON 500 avoids the need for more costly optics components (that must operate under stricter conditions and that are untested and unreliable). WS-HPON 500 thus allows for a desired increase in downstream bandwidth through WDM at a reasonable and efficient cost. In addition, WS-HPON 500 is configured to allow additional upgrades as demand for bandwidth increases (for example, adding additional downstream wavelengths and eventually upgrading to full WDMPON) without a substantial disruption to the network.

Figure 7:
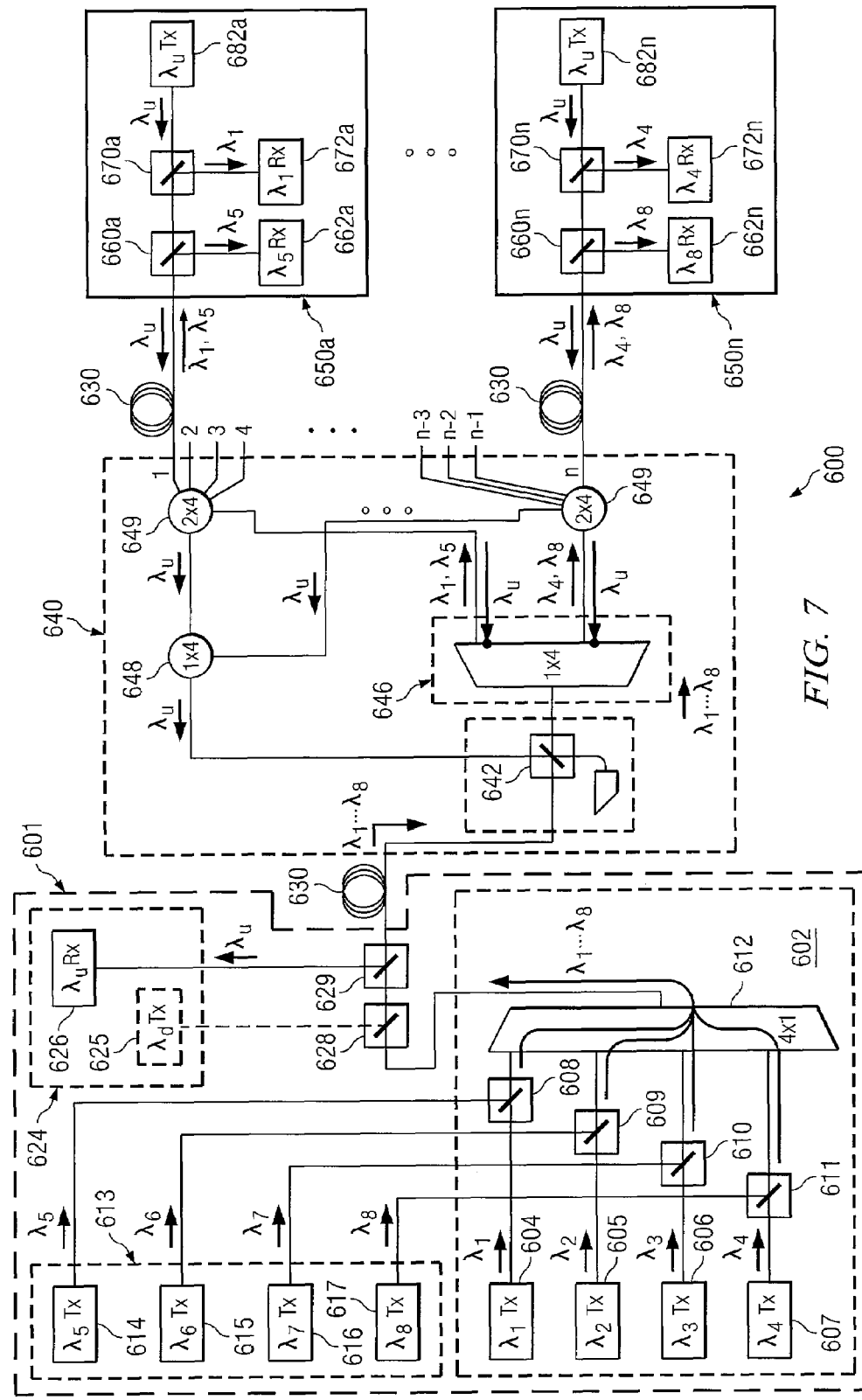
FIG. 7 is a diagram illustrating an example upgrade to the example WS-HPON of FIG. 6.

FIG. 7 is a diagram illustrating an example upgrade to the example WS-HPON of FIG. 6. Upgraded WS-HPON 600 comprises additional transmitters that allow traffic to travel over additional wavelengths, thereby increasing the capacity of the network. As discussed above in conjunction with FIG. 6, example WS-HPON 500 is configured to be easily upgradeable to include additional transmitters. These additional transmitters may replace transmitter 516 and may transmit in and around the same band used by transmitter 516.

Example upgraded WS-HPON 600 comprises OLT 601, optical fiber 630, RN 640, and ONUs 650. OLT 601 (which may be an example of an upstream terminal) comprises first transmission section 602, second transmission section 613, transceiver 624, and filters 628 and 629. First transmission section 602 comprises transmitters 604-607, filters 608-611, and multiplexer 612. Transmitters 604-607 may be the same transmitters as transmitters 504-507 of FIG. 6; thus, these transmitters will not be described again. Filters 608-611 may be the same as filters 508-511 of FIG. 6; thus, these filters will also not be described again. However, it should be noted that each of filters 608-611 now receives traffic in a corresponding wavelength from a transmitter of second transmission section 613. Thus, in the illustrated embodiment, filters 608-611 receive $\lambda_1$-$\lambda_4$, respectively, and $\lambda_5$-$\lambda_8$, respectively. Multiplexer 612 may be the same as multiplexer 512 of FIG. 6; thus, multiplexer 612 will not be described. In particular example networks in which multiplexer 612 is a cyclic multiplexer (as illustrated), multiplexer 612 receives more than one wavelength at each port. In example networks in which multiplexer 612 is not a cyclic multiplexer, filters 608-611 may not be needed (as each transmitter would transmit traffic directly to an input port of multiplexer 612). It should be noted that although eight transmitters, four filters, and one multiplexer are illustrated in example WS-HPON 600, any suitable components may be used to forward WDM signals comprising any suitable number of wavelengths to RN 640.

Second transmission section 613 comprises additional transmitters to transmit traffic over additional wavelengths. In the illustrated example WS-HPON, additional transmitters 614-617 transmit traffic over $\lambda_5$-$\lambda_8$, respectively. In particular example networks, the traffic may be digital data traffic, replacing the analog video signal transmitted by transmitter 516 of example WS-HPON 500. It should be noted that in addition to replacing the video analog transmitter in particular example networks, transmitters 614-617 may also transmit in and around the same band that the analog video signal was transmitted such that receivers 562 of network 500 may be used as receivers 662 of network 600. It should further be noted that although example WS-HPON 600 does not provide WDM for upstream traffic, and thus new receivers are not needed in conjunction with new transmitters 614-617, it may be most economical to implement transceivers for second transmission section 613 instead of only transmitters (in anticipation of a further upgrade to WDM upstream).

Transceiver 624 may be the same as transceiver 524 of FIG. 6; thus, transceiver 624 will not be described again. Filters 628 and 629 may be the same as filters 528 and 529 of FIG. 6; however, it should be noted that filters 628 and 629 are operable to pass $\lambda_1$-$\lambda_8$ in the downstream direction, and filter 629 is operable to direct $\lambda_u$ toward receiver 626. In addition, as discussed in conjunction with filter 528 of FIG. 6, filter 628 may be switched out of the line. As discussed in conjunction with filter 529 of network 500, filter 629 may be removed in alternative networks to allow for WDM upstream.

Optical fiber 630 may comprise any suitable fiber and is operable to carry upstream and downstream traffic. In particular networks, optical fiber 630 may comprise, for example, bidirectional optical fiber. In alternative networks, optical fiber 630 may comprise two different fibers, one for upstream traffic and one for downstream traffic.

RN 640 comprises filter 642, multiplexer 646, primary power splitter 648, and secondary power splitters 649. Filter 642 may comprise any suitable filter operable to pass $\lambda_1$-$\lambda_n$ to multiplexer 646. Filter 642, in particular embodiments, no longer directs any of the downstream wavelengths toward primary power splitter 648. In example WS-HPON 600, filter 642 continues to direct upstream wavelength $\lambda_u$ toward OLT 601. Thus, filter 642 may be the same as filter 542 of FIG. 6 in some embodiments; however, in alternative embodiments, filter 642 may replace filter 542 if filter 542 is not operable to pass $\lambda_1$-$\lambda_8$.

Multiplexer 646 may be the same as multiplexer 546 of FIG. 6 and thus will not be described again. However, it should be noted that multiplexer 646 now demultiplexes $\lambda_5$-$\lambda_8$ in addition to $\lambda_1$-$\lambda_4$. In the illustrated embodiment, multiplexer 646 is a 1×4 cyclic multiplexer, and forwards $\lambda_1$ and $\lambda_5$ through the first output port, $\lambda_2$ and $\lambda_6$ through the second output port, $\lambda_3$ and $\lambda_7$ through the third output port, and $\lambda_4$ and $\lambda_8$ through the fourth output port. In alternative embodiments, multiplexer 646 may be any other suitable multiplexer, and may, for example, forward only one wavelength per output port. In addition, multiplexer 646 may have any suitable number of ports and not necessarily the number illustrated in FIG. 7. It should be noted that in some instances, a cyclic multiplexer may be most cost-efficient, as it may not need to be replaced if the number of downstream wavelengths is increased and exceeds the number of multiplexer ports (such as the increase due to the upgrade illustrated in FIG. 7).

Primary power splitter 648 may be the same as primary power splitter 548 of FIG. 6 and thus will not be described again. However, it should be noted that, in the illustrated example, primary power splitter 648 no longer receives downstream wavelengths since downstream wavelengths $\lambda_1$-$\lambda_8$ are now all routed by multiplexer 646. However, primary power splitter 648 continues to receive and combine upstream traffic over $\lambda_u$ and forward the combined signal to OLT 601. In alternative embodiments, if a transmitter at OLT 601 transmits traffic for broadcast to all ONUs, primary power splitter 648 is operable to receive and split that signal into copies for distribution to all ONUs 650.

Secondary power splitters 649 may be the same as secondary power splitters 549 of FIG. 6 and thus will not be described again. However, it should be noted that in the downstream direction, in the illustrated example network, each secondary power splitter 649 receives traffic in a corresponding one or more of $\lambda_1$-$\lambda_8$ from multiplexer 646 and no signal from primary power splitter 648. In alternative embodiments, there may be a different number of secondary power splitters, and each secondary power splitter may receive different, less, or additional wavelengths. Each secondary power splitter 649 is operable to forward a corresponding one or more of $\lambda_1$-$\lambda_8$ to a corresponding group of ONUs 650. In this way, secondary power splitters 649 allow for wavelength-sharing among ONUs.

ONUs 650 (which may be examples of downstream terminals) may be the same as ONUs 550 of FIG. 6, and thus will not be described again. However, it should be noted that in the illustrated embodiment, in addition to receiving traffic in a corresponding one of $\lambda_1$-$\lambda_4$, each ONU 650 may receive traffic in a corresponding one of $\lambda_5$-$\lambda_8$. Filter 660 is thus operable to direct a corresponding one of $\lambda_5$-$\lambda_8$ to receiver 662. Receiver 662 is operable to receive traffic in $\lambda_5$-$\lambda_8$ (and there is no need to replace receiver 562 during the upgrade to network 600) since $\lambda_5$-$\lambda_8$ are in and around the same band as $\lambda_v$. Thus, receiver 662 is operable to process the signal carried in $\lambda_5$-$\lambda_8$. It should further be noted that the electronics downstream of receiver 662 may be converted to process digital data (as opposed to analog traffic) in some example networks. However, even if these electronics are not converted, they may nonetheless be operable to process digital data carried in $\lambda_5$-$\lambda_8$ suitably.

In operation, transmitters 604-607 and 614-617 of OLT 601 transmit downstream traffic over $\lambda_1$-$\lambda_8$, respectively. Filters 608-611 receive $\lambda_1$-$\lambda_4$, respectively, and $\lambda_5$-$\lambda_8$, respectively, combine their respective signals, and pass the signals to multiplexer 612. For example, filter 608 receives $\lambda_1$ and $\lambda_5$, combines the two signals into one signal, and passes the signal to multiplexer 612. Multiplexer 612, which may include, for example, a cyclic multiplexer, combines the eight wavelengths into one signal and forwards the signal to filter 628. As discussed above, filter 628 may be in-line or may be switched out of the line, in which case the signal would pass directly to filter 629. If filter 628 remains in-line, filter 628 receives the signal from multiplexer 612 and passes the signal to filter 629. Filter 629 receives the signal and allows the signal to pass, forwarding the signal over optical fiber 630 to RN 640.

Filter 642 of RN 640 receives the downstream signal and allows the traffic in $\lambda_1$-$\lambda_8$ to pass to multiplexer 646. In the illustrated example network, traffic in all downstream wavelengths is to be routed to multiplexer 646 and not split by primary power splitter 648 for general broadcast. Thus, primary power splitter 648 of the illustrated example receives none of the traffic in the downstream wavelengths. However, in alternative example networks, power splitter 648 may continue to receive traffic in one or more downstream wavelengths for general broadcast.

Multiplexer 646 receives the signal comprising traffic in $\lambda_1$-$\lambda_8$ and demultiplexes the signal. In the illustrated example network, multiplexer 646 is a cyclic multiplexer, and thus multiplexer 646 forwards traffic in a corresponding pair of wavelengths from each output port to a corresponding secondary power splitter 649. For example, multiplexer 646 forwards $\lambda_1$ and $\lambda_5$ through its first port, $\lambda_2$ and $\lambda_6$ through its second port, $\lambda_3$ and $\lambda_7$ through its third port, and $\lambda_4$ and $\lambda_8$ through its fourth port. Thus, multiple groups of ONUs share multiple wavelengths for reception of downstream traffic. Each secondary power splitter 649 receives a corresponding signal from multiplexer 646 (and no signal from primary power splitter 648) and splits the signal into a suitable number of copies. In the illustrated embodiment, each 2×4 secondary power splitter 649 splits the signal it receives from multiplexer 646 into four copies and forwards each copy to a corresponding ONU 650 over fiber 630. It should be noted again that in alternative networks, the ONUs sharing a WDM wavelength may be different than those illustrated in FIG. 7.

Each ONU 650 receives a copy forwarded by a corresponding secondary power splitter 649. Filter 660 of each ONU 650 receives the signal and directs the traffic in the corresponding one of $\lambda_5$-$\lambda_8$ to receiver 662, which then processes the signal. Filter 660 passes traffic in the corresponding one of $\lambda_1$-$\lambda_4$ to filter 670. Filter 670 directs the traffic in the corresponding one of $\lambda_1$-$\lambda_4$ to receiver 672, which then processes the signal. Again, since each ONU 650 in a group of wavelength-sharing ONUs may share a corresponding one of $\lambda_1$-$\lambda_4$ and a corresponding one of $\lambda_5$-$\lambda_8$ with other ONUs in the group, ONUs 650 must apply a suitable protocol to process the traffic appropriately.

The illustrated, example upgraded WS-HPON 600 has been shown and described as using the increased bandwidth provided by the upgrade to double the bandwidth of each existing group of wavelength-sharing ONUs 650. However, in alternative example networks, the increased bandwidth may be used to increase the number of groups of wavelength-sharing ONUs 650 (such as, for example, from four groups to eight groups) or to allocate bandwidth more dynamically among the ONUs in each group (such as, for example, having one ONU in a group receive and process traffic in two wavelengths and having another ONU in the group receive the traffic in the two wavelengths but process the traffic in only one of the wavelengths). In some of such cases, suitable changes to the RN 640 may be necessary.

In the upstream direction, transmitter 682 of each ONU 650 transmits traffic over $\lambda_u$. Filters 670 and 660 receive and pass the traffic in $\lambda_u$. The signal travels over fiber 630 to RN 640. Each secondary power splitter 649 of RN 640 receives traffic over time-shared $\lambda_u$ and combines the traffic from each ONU 650 in the corresponding group of ONUs 650. Again, since each ONU 650 transmits traffic over upstream wavelength $\lambda_u$, ONUs 650 must adhere to a suitable protocol to time-share $\lambda_u$ such that upstream traffic from ONUs 650 does not collide. After receiving and combining the upstream traffic from the ONUs 650 in the corresponding group into one signal, each secondary power splitter 649 splits the combined signal into two copies, forwarding one copy to multiplexer 646 and one copy to primary power splitter 648. As discussed above, multiplexer 646 of WS-HPON 600 terminates $\lambda_u$ or may allow $\lambda_u$ to pass to filter 642 for suitable termination (since upstream traffic is still not WDM in the illustrated example). Primary power splitter 648 receives traffic in $\lambda_u$ from each secondary power splitter 649, combines the traffic, and forwards the traffic to filter 642. Filter 642 receives the traffic in $\lambda_u$ and directs it toward OLT 601. Fiber 630 carries the traffic in $\lambda_u$ to filter 629 of OLT 601, which directs the traffic toward receiver 626. Receiver 626 receives the signal and processes it.

As demand for upstream bandwidth increases beyond current capacity, network operators may choose to upgrade their WS-HPON (such as WS-HPON 600) to provide WDM upstream as well as downstream. Network operators may upgrade to WDM upstream by providing every ONU within each group of wavelength-sharing ONUs with a transmitter(s) such that the ONUs of that group transmit traffic in the same upstream wavelength(s). Thus, for example, the ONUs in group one may transmit traffic over upstream wavelength $\lambda_1$ (and thus suitably time-share transmission over this wavelength), the ONUs in group two may transmit traffic over upstream wavelength $\lambda_2$ (and thus suitably time-share transmission over this wavelength), and so on. In alternative example networks, the ONUs of one group may transmit traffic over a first plurality of wavelengths, the ONUs of another group may transmit traffic over a second plurality of wavelengths, and so on. In fact, any suitable number of upstream wavelengths may be transmitted by the ONUs of each group (and members of one group may share an additional wavelength with members of another group). In an upgrade of network 600 (in which the OLT has eight receivers to receive eight upstream wavelengths), the ONUs of each group of ONUs may transmit traffic in two wavelengths (resulting in traffic being transmitted in eight total upstream wavelengths). As new transmitters may be added at the ONUs, the $\lambda_u$ transmitters of the ONUs may be replaced with these transmitters.

At the RN, the fibers on either side of the primary power splitter may be terminated, and filter 642 may be taken out of the line (as described further below in conjunction with FIG. 12D). The primary power splitter may no longer be used in either the downstream or upstream direction since the RN's multiplexer would suitably demultiplex downstream traffic and multiplex upstream traffic. For example, the multiplexer may receive a copy of traffic forwarded by each secondary power splitter at a corresponding port, combine the traffic received at its ports into one signal, and forward the combined signal to the OLT. Alternatively, in networks providing WDM upstream over sub-bands (such as, for example, sub-bands of $\lambda_u$), the upstream WDM signals may be received at power splitter 648 and forwarded to the OLT, and the upstream signals forwarded to multiplexer 646 may be suitably terminated.

At the OLT, the multiplexer/demultiplexer may demultiplex the upstream signal into its constituent wavelengths. If the demultiplexer is a cyclic multiplexer, each upstream port may output two or more wavelengths, and filters may further separate the traffic. Receivers coupled to downstream transmitters may receive the upstream traffic in a corresponding wavelength and process the traffic. In the alternative network in which WDM traffic is transmitted in sub-bands of $\lambda_u$, the filter coupling the $\lambda_u$ receiver may be taken out of the line, allowing the sub-bands to pass to the WDM upstream receivers in the OLT. Thus, downstream and upstream WDM would be provided. To upgrade the system further to WDMPON, additional transmitters and receivers would be added at the OLT and at the ONUs (corresponding to the number of additional transmitters and receivers needed to provide a dedicated downstream and upstream wavelength for each ONU) and suitable rewiring would take place at the RN.

Modifications, additions, or omissions may be made to the example WS-HPON 600 described without departing from the scope of the invention. The components of the WS-HPON 600 described may be integrated or separated according to particular needs. Moreover, the operations of the WS-HPON 600 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 8A:
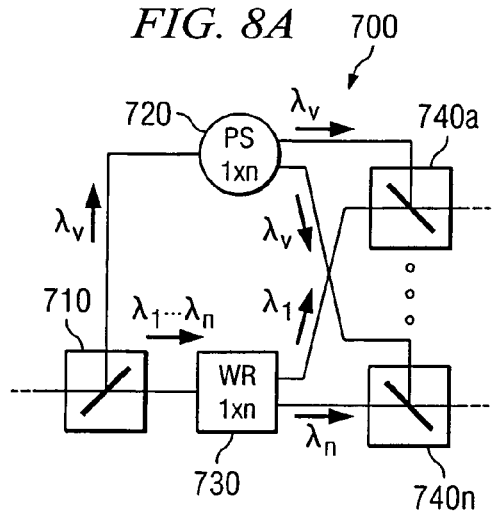
FIGS. 8A and 8B are diagrams illustrating example remote nodes (RNs) that may be implemented in a WDMDO-HPON.
Figure 8B:
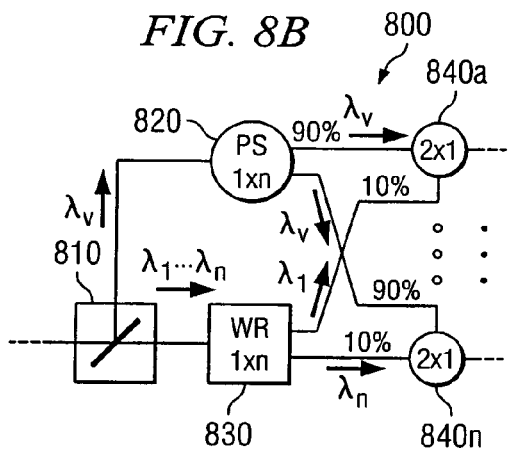

FIGS. 8A and 8B are diagrams illustrating example RNs that may be implemented in a WDMDO-HPON. Example RN 700 of FIG. 8A comprises an RN typically used in WDMDO-HPONs, and example RN 800 of FIG. 8B comprises an improved RN for WDMDO-HPONs. Example RN 700 of FIG. 8A comprises a filter 710, a power splitter 720, a wavelength router 730, and optical filters 740.

As discussed above in conjunction with FIG. 3, the RN of typical WDMDO-HPONs splits a signal, $\lambda_v$, for broadcast to all ONUs (which may be an analog video signal) and demultiplexes the other dedicated wavelengths, $\lambda_1$-$\lambda_n$, (such that the traffic in one of $\lambda_1$-$\lambda_n$ passes to a corresponding ONU). Thus, in RN 700, filter 710 is operable to direct $\lambda_v$ toward power splitter 720 to be broadcast to all ONUs. Filter 710 is also operable to pass all other dedicated wavelengths, $\lambda_1$-$\lambda_n$, to wavelength router 730. Power splitter 720 is operable to receive the traffic in $\lambda_v$ and to split the signal suitably. In the illustrated embodiment, power splitter 720 splits the traffic in $\lambda_v$ into n copies (where n equals the number of ONUs) and forwards a copy to each of filters 740. Wavelength router 730 may include any suitable wavelength router, such as, for example, a multiplexer. Wavelength router 730 is operable to receive the signal comprising dedicated wavelengths $\lambda_1$-$\lambda_n$ from filter 710 and demultiplex the signal into its constituent wavelengths, each wavelength corresponding to one ONU. Wavelength router 730 is further operable to forward each wavelength to a corresponding filter, one of 740a-740n. Each filter 740 is operable to receive traffic in a corresponding one of $\lambda_1$-$\lambda_n$ from wavelength router 730 as well as a copy of the traffic in $\lambda_v$ from power splitter 720, combine these two signals, and forward the combined signal to a corresponding ONU.

In operation, filter 710 of RN 700 receives a signal comprising traffic in dedicated wavelengths, $\lambda_1$-$\lambda_n$, and wavelength $\lambda_v$ to be broadcast to all ONUs. Filter 710 directs the traffic in $\lambda_v$ toward power splitter 720 and passes the traffic in $\lambda_1$-$\lambda_4$ to wavelength router 730. Power splitter 720 receives the traffic in $\lambda_v$, splits it into n copies, and forwards a copy to each filter 740. Wavelength router 730 receives a signal comprising traffic in $\lambda_1$-$\lambda_n$ from filter 710, demultiplexes the signal into its constituent wavelengths, and forwards the traffic in each wavelength to a corresponding filter 740. Each filter 740 receives traffic in a corresponding dedicated wavelength (one of $\lambda_1$-$\lambda_n$) as well as a copy of the traffic in $\lambda_v$, combines these two signals into one signal, and forwards the combined signal to a corresponding ONU.

Due to the number of filters it uses, RN 700 may be quite costly. Thus, a need exists for an RN that uses more cost-efficient optical components. RN 800 of FIG. 8B provides an alternative to RN 700 of FIG. 8A and uses more cost-efficient optical components such as couplers instead of filters, mitigating the power loss disadvantage of couplers by using asymmetric couplers.

RN 800 comprises filter 810, power splitter 820, wavelength router 830, and couplers 840. Filter 810, power splitter 820, and wavelength router 830 may be the same as filter 710, power splitter 720, and wavelength router 730, respectively, of RN 700, and thus will not be described again. Each coupler 840 may include any suitable coupler operable to combine a copy of the traffic in $\lambda_v$ from power splitter 820 and the traffic in a corresponding one of $\lambda_1$-$\lambda_n$ from wavelength router 830. Each coupler 840 may be a 2×1 asymmetric coupler, such that the power loss at each coupler is greater for one input signal than for the other. In RN 800, each coupler 840 may be configured such that the power loss associated with the coupler is greater for the traffic in the corresponding one of $\lambda_1$-$\lambda_n$ than for the traffic in $\lambda_v$. In such a case, in the upstream direction, the copy of the traffic traveling to the power splitter would receive more of the power than the copy of the traffic traveling to the wavelength router, a beneficial result in the case of an upstream wavelength time-shared by all ONUs. In the downstream direction, this asymmetrical distribution of power loss allows each copy from power splitter 820 (which has much less power than the original traffic in $\lambda_v$ before the power split) to receive less of the power loss associated with coupler 840 than the routed traffic in the corresponding one of $\lambda_1$-$\lambda_n$ (which did not lose as much power through wavelength router 830 as the traffic that was split by power splitter 820). Thus, as an example only, the net power of the traffic in the dedicated wavelength and the net power of the traffic in the split wavelength may be substantially the same after each receives its associated power loss at the asymmetric coupler. As another example, the traffic in $\lambda_v$ may be associated with ten percent of the power loss, and the corresponding one of $\lambda_1$-$\lambda_n$ may be associated with ninety percent of the power loss. Power loss may in fact be managed in any suitable manner.

By managing power loss in an asymmetric manner, RN 800 mitigates the disadvantage of using couplers instead of using filters as in RN 700. This disadvantage is that couplers typically produce greater power loss than filters; thus, traffic in $\lambda_v$, already weakened by power splitter 820, would be weakened more by a downstream coupler than by a downstream filter, resulting in a signal of even lower quality. By using asymmetric couplers 840, however, RN 800 distributes greater power loss associated with coupler 840 to the routed traffic (which may suitably accommodate such power loss) than to the split traffic (which may not be able to suitably accommodate more power loss), thereby mitigating the disadvantage of using couplers instead of filters. By mitigating the power loss disadvantage of using couplers instead of filters and by using less expensive asymmetric couplers than more expensive filters, RN 800 offers an improvement to RN 700 of typical WDMDO-HPON networks. It should be noted that although in the illustrated example, the traffic in $\lambda_v$ is associated with ten percent of the power loss, and the traffic in the corresponding one of $\lambda_1$-$\lambda_n$ is associated with ninety percent of the power loss, any suitable ratio may be used.

In operation, filter 810 of RN 800 receives a signal comprising the traffic in dedicated wavelengths, $\lambda_1$-$\lambda_n$, and the traffic in an analog video or other wavelength $\lambda_v$ to be broadcast to all ONUs. Filter 810 directs the traffic in $\lambda_v$ toward power splitter 820 and passes the traffic in $\lambda_1$-$\lambda_n$ to wavelength router 830. Power splitter 820 receives the traffic in $\lambda_v$, splits it into n copies, and forwards a copy to each coupler 840. Wavelength router 830 receives the signal comprising the traffic in $\lambda_1$-$\lambda_n$ from filter 810, demultiplexes the signal into its constituent wavelengths, and forwards the traffic in each wavelength to a corresponding coupler 840. Each coupler 840 receives the traffic in the corresponding wavelength as well as a copy of the traffic in $\lambda_v$ from power splitter 820 and combines these two signals into one signal such that power loss is shared asymmetrically. In the illustrated example RN 800, the copy of the traffic in $\lambda_v$ (which is the weaker of the two signals) receives less of the power loss associated with coupler 840 than the traffic in the routed wavelength (which is the stronger of the two signals). In the illustrated example, the traffic in the routed wavelength receives 90% of the power loss associated with coupler 840 and the copy of the traffic in $\lambda_v$ receives 10% of the power loss. Each coupler 840 then forwards the combined signal to a corresponding ONU.

In the upstream direction, couplers 840 may receive time-shared traffic in $\lambda_u$. Each coupler may split the traffic in $\lambda_u$ that it receives, forwarding one (weaker) copy to wavelength router 830 and one (stronger) copy to power splitter 820. Wavelength router 830 may terminate the copies it receives or may forward the copies to filter 810 for suitable termination. Power splitter 820 may combine the copies it receives and forward the combined signal to filter 810. Filter 810 may receive the combined signal and direct it to the OLT. Filter 810 may also terminate upstream traffic suitably (such as, for example, in an upgrade to WDM upstream, terminating traffic directed to it by power splitter 820).

RN 800 uses less costly components (couplers versus filters) than does RN 700. In addition, downstream signals forwarded by RN 800 have comparable optical characteristics as those forwarded by RN 700. This is so because the disadvantage associated with using couplers instead of filters (that of an increase in power loss and thus decrease in signal performance) is mitigated by the use of asymmetric couplers. As described above, asymmetric couplers shift power loss to the stronger signal (the signal received from the wavelength router) and away from the weaker signal (the signal received from the power splitter), thus managing power loss efficiently.

Modifications, additions, or omissions may be made to the example RN 800 described without departing from the scope of the invention. The components of the example RN 800 described may be integrated or separated according to particular needs. Moreover, the operations of the example RN 800 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 9A:
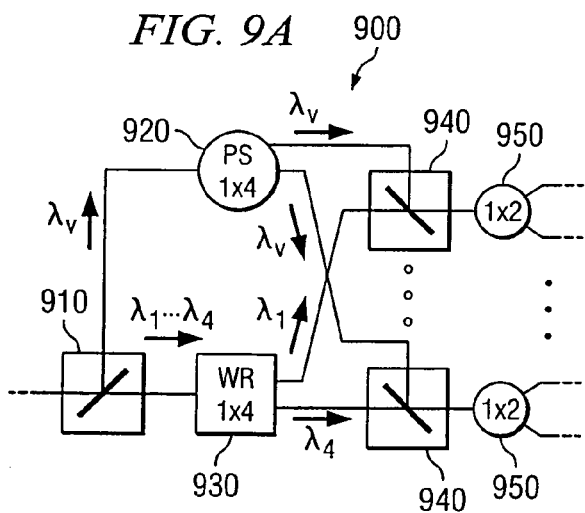
FIGS. 9A and 9B are diagrams illustrating example RNs that may be implemented in a WS-HPON.
Figure 9B:
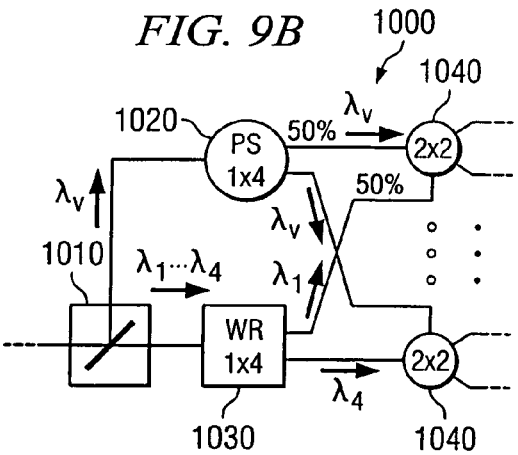

FIGS. 9A and 9B are diagrams illustrating example RNs 900 and 1000 that may be implemented in a WS-HPON. RN 900 of FIG. 9A comprises filter 910, primary power splitter 920, wavelength router 930, filters 940, and secondary power splitters 950. Filter 910 comprises any suitable filter operable to direct analog video traffic in $\lambda_v$ (or any wavelength or type of signal to be broadcast to all ONUs) to primary power splitter 920 and pass traffic in $\lambda_1$-$\lambda_4$ (or traffic in any wavelength which is to be routed) to wavelength router 930. Filter 910 may also receive and forward upstream traffic to the OLT. Primary power splitter 920 comprises any suitable power splitter. Primary power splitter 920 is operable to receive a signal from filter 910, split the signal into a suitable number of copies, and forward each copy to a corresponding filter 940. As an example, in the illustrated example RN, primary power splitter 920 splits the signal in $\lambda_v$ (which may be an analog video signal) into four copies. In the upstream direction, primary power splitter 920 is operable to combine traffic forwarded by filters 940 and forward the traffic to filter 910.

Wavelength router 930 may comprise any suitable wavelength router such as, for example, a multiplexer, operable to receive a signal from filter 910 and suitably route the signal's constituent wavelengths to corresponding filters 940. In the upstream direction, in an example WS-HPON not using WDM upstream, wavelength router 930 may terminate any upstream signal it receives or forward the upstream signal to filter 910 for suitable termination.

Each filter 940 may comprise any suitable filter or other suitable combining element operable to receive a copy of traffic in $\lambda_v$ from primary power splitter 920 and the traffic in a corresponding one of $\lambda_1$-$\lambda_4$ from wavelength router 930. Each filter 940 is further operable to combine the two signals into one signal and forward the signal to a corresponding secondary power splitter 950. In the upstream direction, each filter 940 is operable to direct time-shared $\lambda_u$ to power splitter 920.

Each secondary power splitter 950 may comprise any suitable coupler or combination of couplers, such as, for example, a 1×2 coupler as illustrated. Each secondary power splitter 950 is operable to receive a signal from a corresponding filter 940, split the signal into a suitable number of copies, and forward each copy. In a WS-HPON such as WS-HPON 500, each copy may be forwarded to another corresponding power splitter (such as a 1×2 splitter), and each resulting copy may be forwarded to an ONU. In alternative WS-HPONs, any suitable number of power splitters (such as a single 1×4 secondary power splitter) may be used to split each signal into a suitable number of copies.

In operation, filter 910 receives a downstream signal comprising traffic in $\lambda_4$ and $\lambda_v$, directs the traffic in $\lambda_v$ to primary power splitter 920, and passes the traffic in $\lambda_1$-$\lambda_4$ to wavelength router 930. Primary power splitter 920 receives the signal comprising traffic in $\lambda_v$ from filter 910, splits the signal into a suitable number of copies, and forwards each copy to a corresponding filter 940. Wavelength router 930 receives a signal comprising the traffic in $\lambda_1$-$\lambda_n$ from filter 910 and routes the signal's constituent wavelengths to corresponding filters 940. Each filter 940 receives the traffic in a corresponding one of $\lambda_1$-$\lambda_4$ as well as a copy of the traffic in $\lambda_v$, combines the two signals into one signal, and forwards the signal to a corresponding secondary power splitter 950. Each secondary power splitter 950 splits the signal into a suitable number of copies and forwards each copy. In a WS-HPON such as WS-HPON 500, each copy may be forwarded to another corresponding power splitter (such as a 1×2 splitter), and each resulting copy may be forwarded to an ONU. In alternative WS-HPONs, any suitable number of power splitters (such as a single 1×4 secondary power splitter) may be used to split the signal into a suitable number of copies.

In the upstream direction, each secondary power splitter 950 may receive and combine traffic in time-shared $\lambda_u$ and forward the combined signal to a corresponding filter 940. Each filter 940 may receive the corresponding combined signal and direct it to power splitter 920. Power splitter 920 may receive the combined signals from filters 940, combine them, and forward them to filter 910. Filter 910 may direct the signal forwarded by power splitter 920 to the OLT.

Modifications, additions, or omissions may be made to the example RN 900 described without departing from the scope of the invention. The components of the example RN 900 described may be integrated or separated according to particular needs. Moreover, the operations of the example RN 900 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

RN 900 uses filters 940 and secondary power splitters 950 to combine signals from primary power splitter 920 and wavelength router 930, to split the combined signal into a suitable number of copies, and to forward the copies downstream. Using both filters and secondary power splitters, however, adds considerable expense to RN 900. Example RN 1000 of FIG. 9B illustrates an RN that uses 2×2 secondary power splitters (instead of filters and 1×2 secondary power splitters) to combine signals from the primary power splitter and the wavelength router, split the combined signal into a suitable number of copies, and forward the copies downstream, saving the large expense associated with using filters. Example RN 1000, besides costing less than RN 900, also produces signals with comparable optical characteristics as those in RN 900. This is due to the comparable power loss associated with an M×N power splitter (used in RN 900 in conjunction with filter 940) and an N×N power splitter (used in RN 1000).

RN 1000 comprises filter 1010, primary power splitter 1020, wavelength router 1030, and secondary power splitters 1040. Filter 1010, primary power splitter 1020, and wavelength router 1030 may be the same as filter 910, primary power splitter 920, and wavelength router 930, respectively, of WR 900, and thus will not be described again. Secondary power splitters 1040 of RN 1000 act as an alternative to the combination of filters 940 and secondary power splitters 950 of RN 900. Secondary power splitters 1040 may comprise any suitable power splitters or other suitable combining elements, such as optical couplers. In the illustrated example RN 1000, each secondary power splitter 1040 comprises a 2×2 coupler. In alternative embodiments, secondary power splitters 1040 may comprise any suitable N×N coupler (terminating any unused ports). N×N couplers are used because these couplers may perform two functions: combining N signals and splitting the combined signal into N copies. Furthermore, the power loss associated with an N×N coupler is comparable to that associated with a 1×N coupler. Thus, the function of two devices such as the costly filter and the 1×N secondary power splitter in RN 900 is performed by the N×N secondary power splitter, and the power loss between the two RNs is comparable. In the illustrated embodiment, each 2×2 secondary power splitter 1040 is operable to receive traffic in $\lambda_v$ from primary power splitter 1020 and routed traffic in a corresponding one of $\lambda_1$-$\lambda_4$ from wavelength router 1030, combine the traffic in the two signals into one signal, split the traffic in the signal into two copies, and forward each copy to one or more ONUs. In a WS-HPON such as WS-HPON 500, each copy may be forwarded to another corresponding power splitter (such as a 1×2 splitter), and each resulting copy may be forwarded to an ONU. Alternatively, the secondary power splitters may be 4×4 couplers (with two input ports terminated in each coupler), each 4×4 coupler forwarding a copy of the combined traffic to an ONU. In either alternative, any suitable number of power splitters may be used to split each signal into a suitable number of copies. In the upstream direction, each power splitter 1040 is operable to receive traffic in time-shared $\lambda_u$ from a corresponding group of wavelength-sharing ONUs, combine the traffic, split the combined traffic into two copies, and forward one copy to wavelength router 1030 (which may then be suitably terminated) and one copy to power splitter 1020 (which may then be combined with other traffic in $\lambda_u$ and forwarded to filter 1010).

In operation, filter 1010 receives a signal comprising traffic in $\lambda_1$-$\lambda_n$ and $\lambda_v$, directs traffic in $\lambda_v$ to primary power splitter 1020, and allows traffic in $\lambda_1$-$\lambda_4$ to pass to wavelength router 1030. Primary power splitter 1020 splits the signal comprising traffic in $\lambda_v$ into a suitable number of copies, and forwards each copy to a corresponding secondary power splitter 1040. Wavelength router 1030 demultiplexes the signal comprising the traffic in $\lambda_1$-$\lambda_4$, and forwards the traffic in each wavelength to a corresponding one or more secondary power splitters 1040. Each secondary power splitter 1040 receives a copy of the traffic in $\lambda_v$ from primary power splitter 1020 and the traffic in a corresponding one of $\lambda_1$-$\lambda_4$ from wavelength router 1030, combines the two signals into one signal, splits the signal into a suitable number of copies, and forwards each copy downstream. In a WS-HPON such as WS-HPON 500, each copy may be forwarded to another corresponding power splitter (such as a 1×2 splitter), and each resulting copy may be forwarded to an ONU. Alternatively, the secondary power splitters may be 4×4 couplers (with two input ports terminated in each coupler), each 4×4 coupler forwarding a copy of the combined traffic to an ONU. In either alternative, any suitable number of power splitters may be used to split each signal into a suitable number of copies. As discussed above, by combining the functions of the filter and secondary power splitter of RN 900 into one N×N power splitter, RN 1000 provides a less-costly alternative and provides signals with comparable optical characteristics.

In the upstream direction, each secondary power splitter 1040 may receive traffic in time-shared $\lambda_u$ from a corresponding group of wavelength-sharing ONUs, combine the traffic, split the combined traffic into two copies, and forward one copy to wavelength router 1030. Wavelength router 1030 may then suitably terminate the copy or forward the copy to filter 1010 for suitable termination (internal or external to the filter). Each secondary power splitter 1040 forwards a second copy to primary power splitter 1020. Primary power splitter 1020 may receive a copy from each secondary power splitter 1040, combine the traffic into one signal, and forward the combined signal to filter 1010. Filter 1010 may receive the combined signal and direct it to the OLT. Filter 1010 may also terminate upstream traffic suitably (such as, for example, in an upgrade to WDM upstream, terminating traffic directed to it by power splitter 1020).

Modifications, additions, or omissions may be made to the example RN 1000 described without departing from the scope of the invention. The components of the example RN 1000 described may be integrated or separated according to particular needs. Moreover, the operations of the example RN 1000 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable corresponding changes to the network).

Figure 10A:
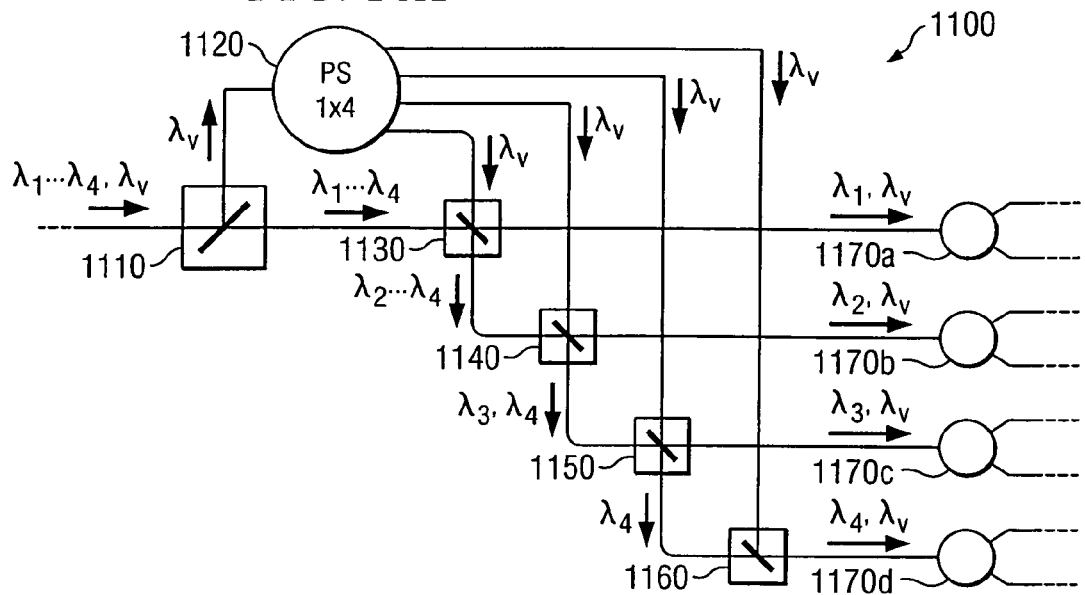
Figure 10B:
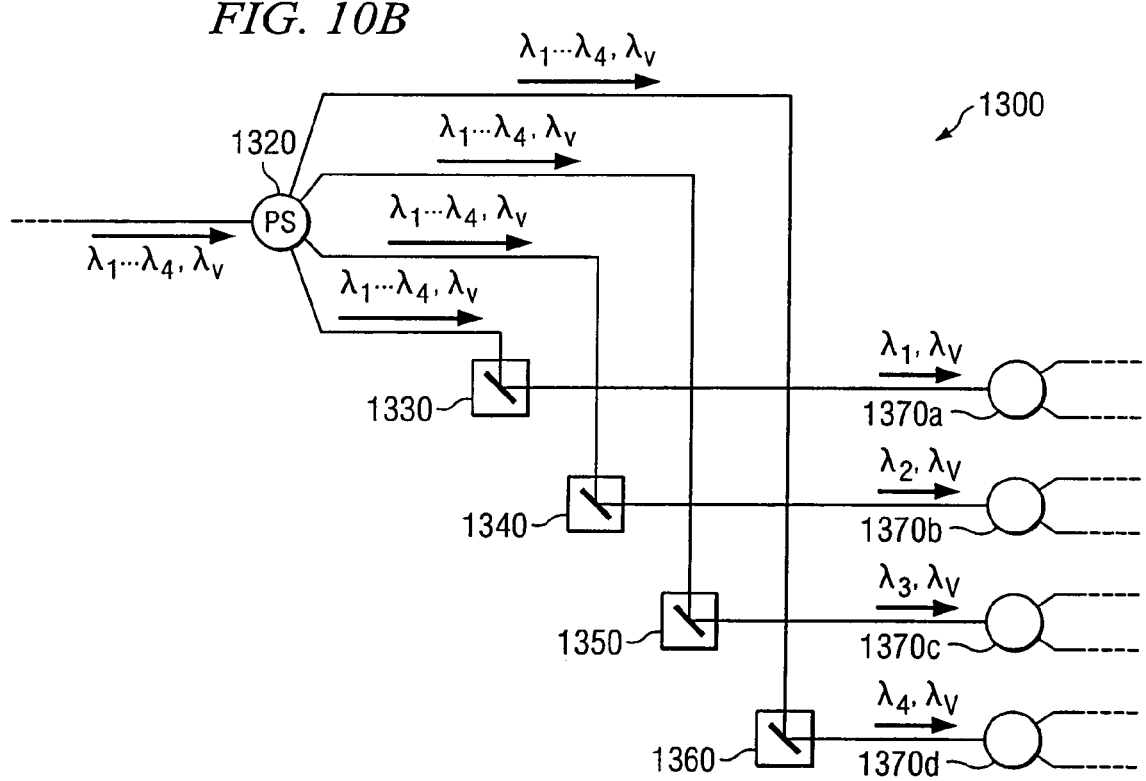

FIGS. 10A and 10B are diagrams illustrating additional example RNs that may be implemented in a WS-HPON. Example RNs 1100 and 1300 illustrate RNs that route wavelengths without using a multiplexer, providing a potentially less costly RN solution, while producing signals with comparable optical characteristics. Example RN 1100 of FIG. 11A comprises a filter 1110, a primary power splitter 1120, filters 1130-1160, and secondary power splitters 1170. Filter 1110 may be the same as filter 710 or filter 910 of FIGS. 8A and 9A, respectively. Thus, filter 1110 will not be described again. Primary power splitter 1120 may comprise any suitable power splitter operable to receive a signal from filter 1110 and split the signal into a suitable number of copies. As an example, in the illustrated example RN, primary power splitter 1120 splits an analog video signal or other traffic in 4, into four copies. Primary power splitter 1120 forwards each copy to a corresponding filter, one of filters 1130-1160 (but may alternatively forward each copy to a corresponding secondary power splitter 1170). In the upstream direction, power splitter 1120 may be operable to receive traffic in $\lambda_u$ from filters 1130-1160 (or alternatively, from secondary power splitters 1170). If the network provides WDM capabilities upstream, filters 1130-1160 may be operable to forward the upstream traffic to filter 1110 (and may bypass power splitter 1120).

Filters 1130-1160 may comprise any suitable filters (such as, for example, four-port, thin-film filters) or suitable combinations of filters (such as, for example, suitable combinations of three-port filters). Filter 1130 is operable to receive a signal comprising multiple wavelengths from filter 1110 and a copy of the signal split by primary power splitter 1120. In the illustrated example, filter 1130 is operable to receive a signal from filter 1110 comprising traffic in $\lambda_1$-$\lambda_4$ pass traffic in $\lambda_1$ to secondary power splitter 1170a, and direct traffic in $\lambda_2$-$\lambda_4$ to filter 1140. Filter 1130 is further operable to receive a copy of traffic in $\lambda_v$ from primary power splitter 1120 and direct it to secondary power splitter 1170a. Thus, filter 1130 may forward traffic in $\lambda_1$ and $\lambda_v$ to secondary power splitter 1170a.

Similarly, filter 1140 is operable to receive the traffic in $\lambda_2$-$\lambda_4$ from filter 1130 and a copy of the traffic in $\lambda_v$ from primary power splitter 1120. Filter 1140 is further operable to pass the traffic in $\lambda_2$ to secondary power splitter 1170b, direct traffic in $\lambda_v$ to secondary power splitter 1170b, and direct traffic in $\lambda_3$ and $\lambda_4$ toward filter 1150. Thus, filter 1140 may forward traffic in $\lambda_2$ and $\lambda_v$ to secondary power splitter 1170b.

Likewise, filter 1150 is operable to receive traffic in $\lambda_3$ and $\lambda_4$ from filter 1140 and a copy of traffic in $\lambda_v$ from primary power splitter 1120. Filter 1150 is further operable to pass traffic in $\lambda_3$ to secondary power splitter 1170c, direct traffic in $\lambda_v$ to secondary power splitter 1170c, and direct traffic in $\lambda_4$ toward filter 1160. Thus, filter 1140 may forward traffic in $\lambda_3$ and $\lambda_v$ to secondary power splitter 1170c.

In addition, filter 1160 is operable to receive traffic in $\lambda_4$ from filter 1150 and a copy of traffic in $\lambda_v$ from primary power splitter 1120. Filter 1160 is further operable to pass traffic in $\lambda_4$ and direct traffic in $\lambda_v$ to secondary power splitter 1170d. Any remaining wavelengths may be terminated. Because each of filters 1130-1160 passes a wavelength and directs the remaining wavelengths (if any) to downstream filters (if any), the filters may be referred to as a "cascaded" filters. It should be noted that any suitable number of wavelengths may be forwarded by one or more filters to a secondary power splitter. It should further be noted that there may be any suitable number of chains of cascaded filters in an RN.

Each secondary power splitter 1170 is operable to receive a signal from a corresponding filter (one of filters 1130-1160), split the signal into a suitable number of copies, and forward each copy to a suitable number of ONUs. A suitable number of additional couplers may be used to further split the signals such that each ONU receives a suitable signal. It should be noted that although RN 1100 has been described with reference to a WS-HPON, RN 1100 may also be implemented in WDMDO-HPONs and in other PONs using WDM (by, for example, removing secondary power splitters 1170 and/or adding additional cascaded filters for routing any additional wavelengths). It should further be noted that, in an alternative example RN, copies of the broadcast traffic in $\lambda_v$ may be forwarded by primary power splitter 1120 to secondary power splitters 1170 instead of being forwarded to the filters themselves.

In operation, filter 1110 receives a signal comprising traffic in $\lambda_1$-$\lambda_4$ and $\lambda_v$, directs traffic in $\lambda_v$ toward primary power splitter 1120 and passes traffic in the remaining wavelength, $\lambda_1$-$\lambda_4$ to filter 1130. Primary power splitter 1120 receives the signal comprising the traffic in $\lambda_v$ and splits the signal into a suitable number of copies. In the illustrated example RN, primary power splitter 1120 splits the signal into four copies and forwards each copy to a corresponding one of filters 1130-1160. Filter 1130 receives the signal comprising the traffic in $\lambda_1$-$\lambda_4$ from filter 1110 and a copy of the traffic in $\lambda_v$ from primary power splitter 1120. Filter 1130 passes the traffic in $\lambda_1$ to secondary power splitter 1170*a*, directs the traffic in $\lambda_2$-$\lambda_4$ toward filter 1140, and directs the traffic in $\lambda_v$ toward secondary power splitter 1170*a*. Filter 1140 receives the signal comprising the traffic in $\lambda_2$-$\lambda_4$ from filter 1130 and a copy of the traffic in $\lambda_v$ from primary power splitter 1120. Filter 1140 passes traffic in $\lambda_2$ to secondary power splitter 1170*b*, directs traffic in $\lambda_3$ and $\lambda_4$ toward filter 1150, and directs traffic in $\lambda_v$ toward secondary power splitter 1170*b*. Filter 1150 receives the signal comprising traffic in $\lambda_3$ and $\lambda_4$ from filter 1140 and a copy of traffic in $\lambda_v$ from primary power splitter 1120. Filter 1150 passes traffic in $\lambda_3$ to secondary power splitter 1170*c*, directs traffic in $\lambda_4$ toward filter 1160, and directs traffic in $\lambda_v$ toward secondary power splitter 1170*c*. Filter 1160 receives the signal comprising traffic in $\lambda_4$ from filter 1150 and a copy of traffic in $\lambda_v$ from primary power splitter 1120. Filter 1160 passes traffic in $\lambda_4$ and directs traffic in $\lambda_v$ to secondary power splitter 1170*d*. Filter 1160 may suitably terminate any remaining wavelengths. Although in the illustrated example RN 1100 there are no other filters in the cascade, alternative RNs may have more or less wavelengths to route (and thus filters). Each secondary power splitter 1170 receives a signal comprising the traffic in $\lambda_v$ and the traffic in a corresponding one of $\lambda_1$-$\lambda_4$ and splits the signal into a suitable number of copies. A suitable number of additional couplers may further split the signals such that each ONU receives a suitable signal.

In the upstream direction, secondary power splitters 1170 may receive upstream traffic in time-shared $\lambda_u$, combine the traffic, and forward the combined signal to filters 1130-1160. Each filter 1130-1160 may receive a corresponding combined signal and forward the signal to primary power splitter 1120. Primary power splitter 1120 receives and combines the combined signals and forwards the resulting signal to filter 1110. Filter 1110 receives the signal and forwards it to the OLT. In the case of WDM upstream, the traffic in the multiple upstream wavelengths may circumvent power splitter 1120.

Example RN 1100 may perform wavelength routing without the use of a costly multiplexer. By not using a multiplexer, RN 1100 may be less costly (while providing comparable performance) than RNs that do use a multiplexer. It should be noted that although RN 1100 has been described with reference to WS-HPON, RN 1100 may also be implemented in other HPONs such as WDMDO-HPON (by, for example, removing secondary power splitters 1170 and adding a suitable number of additional cascading filters for routing any additional wavelengths).

Modifications, additions, or omissions may be made to the example RN 1100 described without departing from the scope of the invention. The components of the example RN 1100 described may be integrated or separated according to particular needs. Moreover, the operations of the example RN 1100 described may be performed by more, fewer, or other components. As examples only, alternative networks may comprise redundant lines from the OLT suitably coupled to the RN, the RN may provide any suitable number of outputs to the ONUs, and any suitable number of wavelength routers and/or chains of cascaded filters may be added to the RN (making suitable changes to the network).

FIG. 10B illustrates an additional example RN that may be implemented in a WS-HPON. Example RN 1300 of FIGURE 10C does not use a filter corresponding to filter 1110 of RN 1100 and thus may cost less than RN 1100 of FIG. 10A. However, by foregoing the use of a filter corresponding to filter 1110 of RN 1100, example RN 1300 may require a less tolerant (and thus possibly more expensive) thin-film filter design. In addition, by splitting traffic in all downstream wavelengths (instead of splitting only traffic that is to be broadcast), RN 1300 may introduce higher insertion loss for routed signals than RN 1100, producing signals with less desirable optical characteristics than those produced by RN 1100.

Example RN 1300 comprises primary power splitter 1320, filters 1330-1360, and secondary power splitters 1370. Primary power splitter 1320 comprises any suitable power splitter operable to receive a downstream signal comprising multiple wavelengths. Primary power splitter 1320 is further operable to split the signal into a suitable number of copies. In the illustrated embodiment, the downstream signal comprises traffic in $\lambda_1$-$\lambda_4$ and $\lambda_v$, where the traffic in $\lambda_1$-$\lambda_4$ is to be routed by RN 1300 to corresponding groups of wavelength-sharing ONUs and traffic in $\lambda_v$ is to be broadcast by RN 1300 to all ONUs. In alternative example RNs, the number of wavelengths may differ from that illustrated. In such RNs, any suitable number of wavelengths (and corresponding optical components) may be provided. In the upstream direction, primary power splitter 1320 is operable to receive traffic in time-shared $\lambda_u$ from filters 1330-1360, combine the traffic, and forward the combined signal to the OLT.

Filter 1330 may comprise any suitable filter. Filter 1330 is operable to receive a copy of the traffic in $\lambda_1$-$\lambda_4$ and $\lambda_v$ from primary power splitter 1320. Filter 1330 is further operable to direct the traffic in $\lambda_1$ and $\lambda_v$ toward secondary power splitter 1370*a*. Filter 1330 is further operable to suitably terminate (internally or externally) the traffic in the remaining wavelengths, $\lambda_2$-$\lambda_4$.

Filter 1340 may comprise any suitable filter. Filter 1340 is operable to receive a copy of the traffic in $\lambda_1$-$\lambda_4$ and $\lambda_v$ from primary power splitter 1320. Filter 1340 is further operable to direct the traffic in $\lambda_2$ and $\lambda_v$ toward secondary power splitter 1370$b$. Filter 1340 is further operable to suitably terminate (internally or externally) the traffic in the remaining wavelengths, $\lambda_1$ and $\lambda_3$-$\lambda_4$.

Filter 1350 may comprise any suitable filter. Filter 1350 is operable to receive a copy of the traffic in $\lambda_1$-$\lambda_4$ and $\lambda_v$ from primary power splitter 1320. Filter 1350 is further operable to direct the traffic in $\lambda_3$ and $\lambda_v$ toward secondary power splitter 1370$c$. Filter 1350 is further operable to suitably terminate (internally or externally) the traffic in the remaining wavelengths, $\lambda_1$-$\lambda_2$ and $\lambda_4$.

Filter 1360 may comprise any suitable filter. Filter 1360 is operable to receive a copy of the traffic in $\lambda_1$-$\lambda_4$ and $\lambda_v$ from primary power splitter 1320. Filter 1360 is further operable to direct the traffic in $\lambda_4$ and $\lambda_5$ toward secondary power splitter 1370$d$. Filter 1360 is further operable to suitably terminate (internally or externally) the remaining wavelengths, $\lambda_1$-$\lambda_3$.

Each secondary power splitter 1370 may comprise any suitable power splitter, such as a coupler, operable to receive a signal from a corresponding one of filters 1330-1360. Each signal comprises traffic in $\lambda_v$ and traffic in a corresponding one of $\lambda_1$-$\lambda_4$. Each secondary power splitter 1370 is further operable to split the received signal into a suitable number of copies and forward each copy to one or more wavelength-sharing ONUs.

In operation, primary power splitter 1320 receives a downstream signal comprising traffic in $\lambda_1$-$\lambda_4$ and $\lambda_v$, splits the signal into four copies, and forwards each copy to a corresponding one of filters 1330-1360. Filter 1330 receives a copy from primary power splitter 1320, directs the traffic in $\lambda_1$ and $\lambda_v$ to secondary power splitter 1370$a$, and suitably terminates (internally or externally) the traffic in the remaining wavelengths ($\lambda_2$-$\lambda_4$). Filter 1340 receives a copy from primary power splitter 1320, directs the traffic in $\lambda_2$ and $\lambda_v$ to secondary power splitter 1370$b$, and suitably terminates (internally or externally) the traffic in the remaining wavelengths ($\lambda_1$ and $\lambda_3$-$\lambda_4$). Filter 1350 receives a copy from primary power splitter 1320, directs the traffic in $\lambda_3$ and $\lambda_v$ to secondary power splitter 1370$c$, and suitably terminates (internally or externally) the traffic in the remaining wavelengths ($\lambda_1$-$\lambda_2$ and $\lambda_4$). Filter 1360 receives a copy from primary power splitter 1320, directs the traffic in $\lambda_4$ and $\lambda_v$ to secondary power splitter 1370$d$, and suitably terminates (internally or externally) the traffic in the remaining wavelengths ($\lambda_1$-$\lambda_3$). Each secondary power splitter 1370 receives a signal from a corresponding one of filters 1330-1360, splits the signal into a suitable number of copies, and forwards each copy to one or more wavelength-sharing ONUs. Additional couplers may further split the signals such that each ONU receives a suitable signal.

In the upstream direction, secondary power splitters 1370 may receive upstream traffic in time-shared $\lambda_u$, combine the traffic, and forward the combined signal to filters 1330-1360. Each filter 1330-1360 may receive a corresponding combined signal and forward the signal to primary power splitter 1320, suitably terminating other traffic. Primary power splitter 1320 receives and combines the combined signals and forwards the resulting signal to the OLT.

Thus, example RN 1300 may perform wavelength routing without the use of a costly multiplexer. Furthermore, example RN 1300 does not use a filter corresponding to filter 1110 of example RN 1100. Although not using such a filter may provide a less costly RN, using filters 1330-1360 which may be less tolerant (and thus more costly) than those of RN 1100 may offset any cost savings. In addition, the optical characteristics of routed traffic in wavelengths $\lambda_1$-$\lambda_4$ may be less desirable than the routed traffic in RN 1100.

It should be noted that although four wavelengths are illustrated in example RN 1300, any suitable number of WDM wavelengths may be routed (using a suitable number of filters and couplers). It should also be noted that although RN 1300 has been described with reference to a WS-HPON, RN 1300 may also be implemented in other HPONs using WDM such as WDMDO-HPON (by, for example, removing secondary power splitters 1370 and adding suitable filters for routing any additional wavelengths).

Modifications, additions, or omissions may be made to the example RN 1300 described without departing from the scope of the invention. The components of the example RN 1300 described may be integrated or separated according to particular needs. Moreover, the operations of the example RN 1300 described may be performed by more, fewer, or other components. As examples only, alternative networks may comprise redundant lines from the OLT suitably coupled to the RN, the RN may provide any suitable number of outputs to the ONUs, and any suitable number of wavelength routers and/or chains of filters may be added to the RN (making suitable corresponding changes to the network).

Figure 11A:
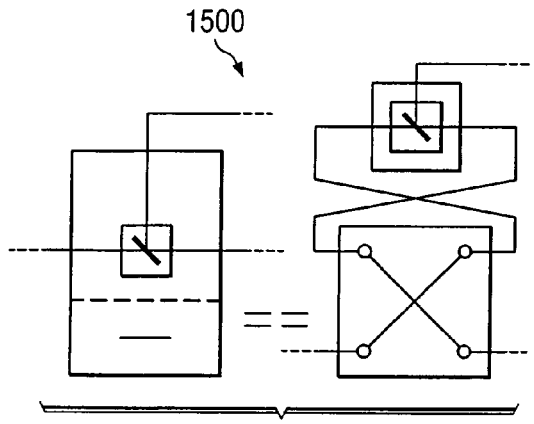
FIGS. 11A and 11B are diagrams illustrating additional example RNs that may be implemented in a WS-HPON.
Figure 11B:
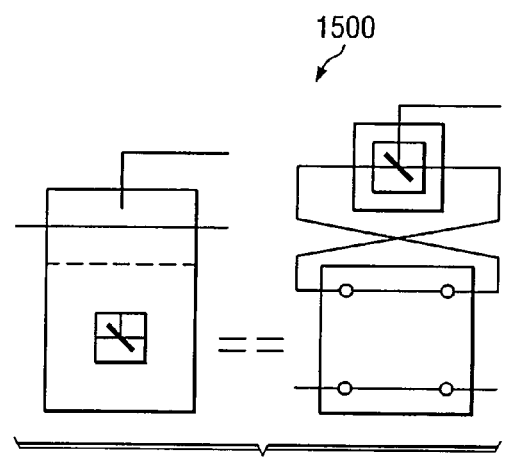

FIGS. 11A and 11B are diagrams illustrating example components for switching a filter in or out of the line during a network upgrade. System 1500 comprises a switch and a filter. The left side of each of FIGS. 11A and 11B illustrates a symbolic representation of the state of the filter (in or out of the line). The right side illustrates actual example components for switching of the filter in or out of the line. The switch of system 1500 may comprise any suitable switch and is operable to switch the filter in or out of the line. The filter coupled to the switch may include any of the filters discussed above, such as, for example, filters 428, 528, or 628 of networks 400, 500, or 600, respectively (which may be removed from a PSPON after an upgrade). Coupling switches to the filters described allows for easy connection or disconnection of the filters from the network, avoiding contamination of connectors and providing a fast upgrade of the network. So, for example, in an upgrade of a PSPON, if the PSPON transmitter will no longer be used (or will be used only occasionally), the filter (such as, for example, filter 528 of network 500) coupling the PSPON transmitter to the network may seamlessly be taken out of the line using a switch as illustrated in FIG. 11B. Due to the switch, no cut need be made to the fiber coupling the filter to the network, avoiding disruptions in service and contamination of connectors.

FIGS. 12A, 12B, 12C and 12D are diagrams illustrating example components for switching filters in or out of the line during a network upgrade. More specifically, FIGS. 12A-12D illustrate an example filter system 1600 that may be added to an RN of an upgradeable PSPON and remain in HPON (such as WS-HPON) and WDMPON upgrades. As an example, filter system 1600 may be used in place of filter 442 of network 400, filter 542 of network 500, and filter 642 of network 600. By having a filter system that is operable to suitably filter traffic for networks 400, 500, and 600, network operators need not cut fiber, replace components, or risk contamination or service disruption at this point of the network. Thus, filter system 1600 may enhance the upgradeability of PSPON 400 by anticipating upgrades to the network (such as those described in conjunction with networks 500 and 600). As in FIGS. 11A and 11B, the left side of each of FIGS. 12A, 12B, 12C and 12D illustrates a symbolic representation of the state of the filter(s) (in or out of the line). The right side illustrates actual example components for switching of the filter(s) in or out of the line.

Filter system 1600 comprises filters 1610, 1620, and 1630 coupled to corresponding switches. Filter 1610 may comprise any suitable filter operable to pass downstream WDM traffic (for example, in the above-described WS-HPON, traffic in $\lambda_1$-$\lambda_8$) and broadcast traffic (for example, in the above-described WS-HPON, traffic in $\lambda_d$ and $\lambda_v$) to filter 1620. Filter 1610 is further operable to receive traffic in upstream wavelength $\lambda_u$ from filter 1630 and direct it to the OLT. Filter 1620 may comprise any suitable filter operable to receive the downstream WDM traffic and broadcast traffic from filter 1610, direct the broadcast traffic toward filter 1630, and pass the WDM traffic toward a wavelength router. Filter 1630 may comprise any suitable filter and is operable to receive the downstream broadcast traffic from filter 1620 and direct the broadcast traffic toward the power splitter. Filter 1630 is further operable to receive upstream traffic in $\lambda_u$ and pass it to filter 1610.

Figure 12A:
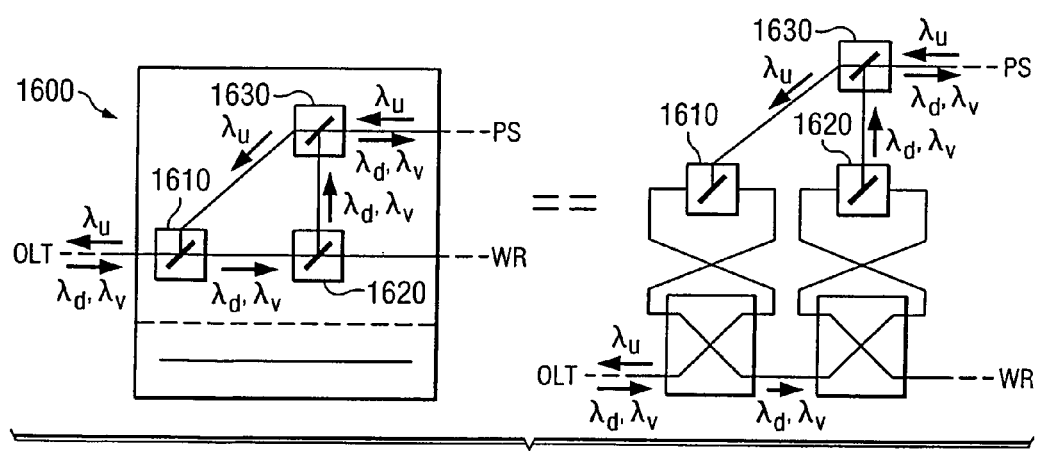
FIGS. 12A, 12B, 12C and 12D are diagrams illustrating example components for switching filters in or out of the line during a network upgrade.

FIG. 12A illustrates the components and operation of filter system 1600 in a PSPON such as upgradeable PSPON 400. In operation, filter 1610 receives downstream broadcast traffic in $\lambda_d$ and $\lambda_v$ and passes $\lambda_d$ and $\lambda_v$ to filter 1620. Filter 1620 receives the downstream broadcast traffic and directs it toward filter 1630. Filter 1630 receives the downstream broadcast traffic and directs it toward the power splitter. In the upstream direction, filter 1630 receives upstream traffic in time-shared $\lambda_u$ and passes it to filter 1610. Filter 1610 receives the upstream traffic and directs it toward the OLT.

Figure 12B:
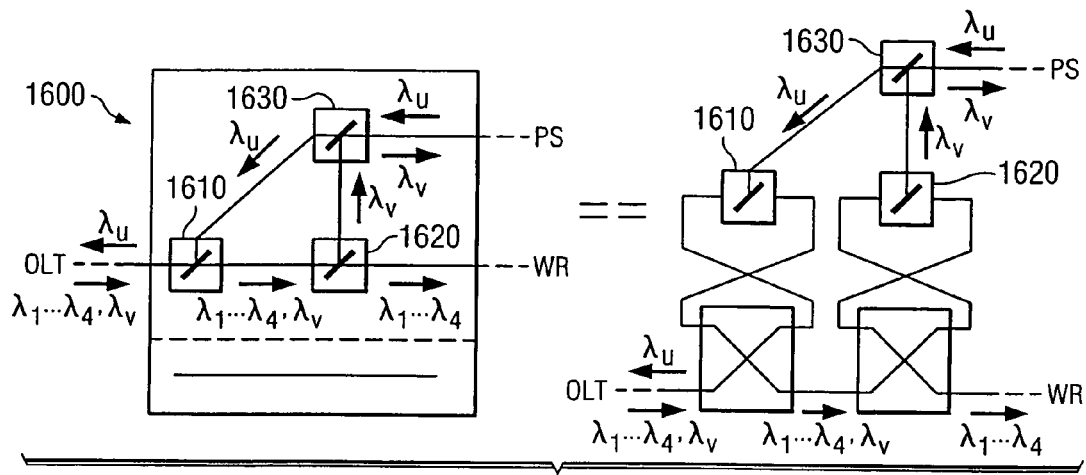

FIG. 12B illustrates the components and operation of filter system 1600 of FIG. 12A after an upgrade to a WS-HPON (such as WS-HPON 500 of FIG. 6). The upgrade includes the addition of four new transmitters which transmit downstream WDM traffic in $\lambda_1$-$\lambda_4$. Furthermore, in this upgrade, downstream traffic is being broadcast only in $\lambda_v$. Upstream traffic continues to be transmitted in time-shared $\lambda_u$. In operation, in the downstream direction, filter 1610 receives WDM traffic in $\lambda_1$-$\lambda_4$ and broadcast traffic in $\lambda_v$, and passes the traffic in $\lambda_1$-$\lambda_4$ and $\lambda_v$ to filter 1620. Filter 1620 receives the traffic in $\lambda_1$-$\lambda_4$ and $\lambda_v$, directs the traffic in $\lambda_v$ toward filter 1630, and allows the traffic in $\lambda_1$-$\lambda_4$ to pass to the wavelength router. Filter 1630 receives the traffic in $\lambda_v$ and directs it toward the power splitter. In the upstream direction, filter 1630 receives the traffic in $\lambda_u$ and allows it to pass to filter 1610. Filter 1610 receives the traffic in $\lambda_u$ and directs it toward the OLT. Thus, an upgrade from PSPON to WS-HPON may be made without replacing components at this point in the network, avoiding service disruption and contamination of components.

Figure 12C:
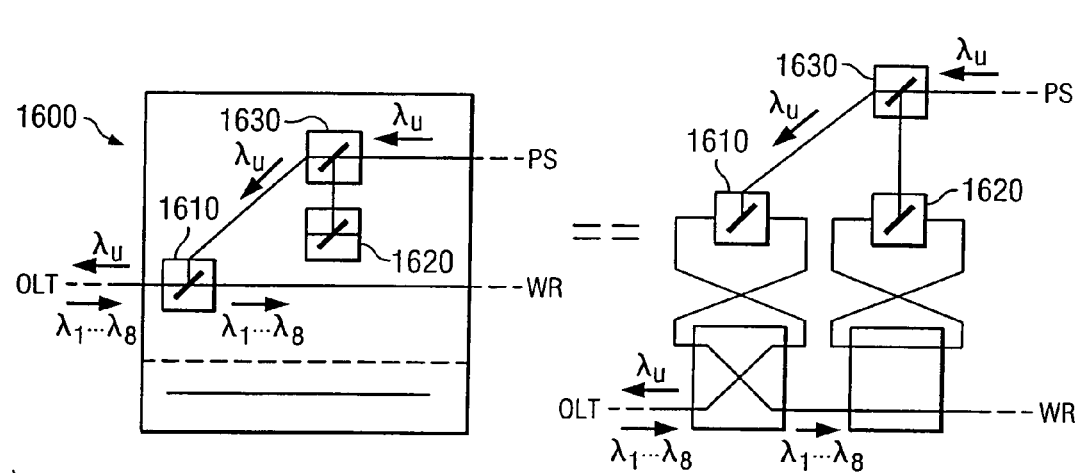

FIG. 12C illustrates the components and operation of filter system 1600 of FIG. 12A after a further upgrade to the network (such as the upgrade represented by WS-HPON 600 of FIG. 7). The upgrade includes the addition of four new transmitters transmitting downstream WDM traffic in $\lambda_5$-$\lambda_8$ (which may be in and around the band of $\lambda_v$). Furthermore, in this example upgrade, downstream traffic is no longer being broadcast. Upstream traffic continues to be transmitted in time-shared $\lambda_u$. In operation, in the downstream direction, filter 1610 receives the traffic in $\lambda_1$-$\lambda_8$ and passes it to the wavelength router. Filter 1620 is switched out of the line since it no longer forwards broadcast downstream traffic to the power splitter. In the upstream direction, filter 1630 receives traffic in $\lambda_u$ and allows it to pass to filter 1810. Filter 1610 receives the traffic in $\lambda_u$ and directs it toward the OLT. Again, an upgrade to the network may be made without replacing components at this point in the network, avoiding service disruption and contamination of components.

Figure 12D:
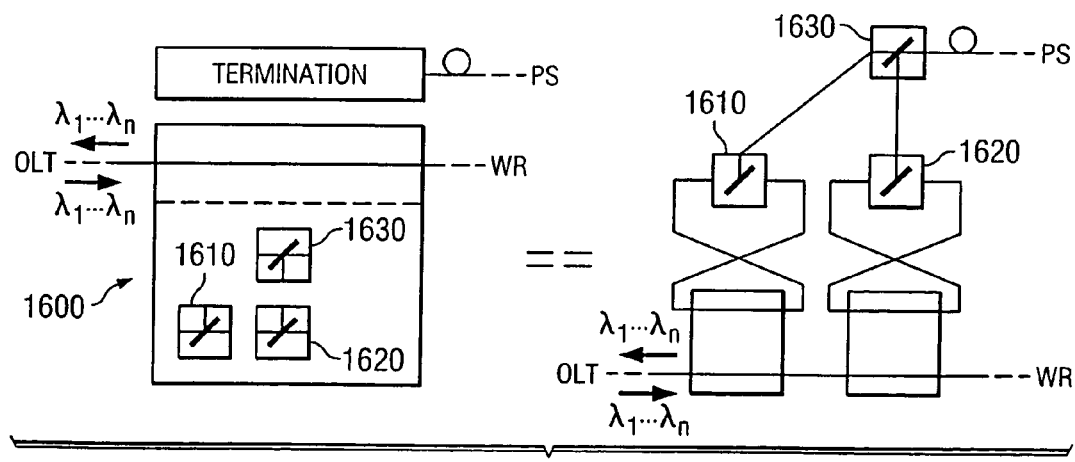

FIG. 12D illustrates the components and operation of filter system 1600 of FIG. 12A after a further upgrade to a WDM-PON (or to a WS-HPON with upstream WDM capabilities). The upgrade includes the addition of new transmitters at the OLT and at the ONUs such that each ONU is associated with a dedicated downstream and upstream wavelength. Thus, traffic in $\lambda_1$-$\lambda_n$ is transmitted in the downstream direction, and traffic in $\lambda_1$-$\lambda_n$ is transmitted in the downstream direction (where n represents the number of ONUs). $\lambda_1$-$\lambda_n$ in the downstream direction may be the same (or different) as $\lambda_1$-$\lambda_n$ in the upstream direction. In operation, the traffic in $\lambda_1$-$\lambda_n$ travels from the OLT to the wavelength router in the downstream direction, and the traffic in $\lambda_1$-$\lambda_n$ travels from the wavelength router to the OLT in the upstream direction. As illustrated, filter system 1600 may be switched out of the network, as the filters no longer direct traffic to or from the power splitter. Thus, the line from the power splitter to filter system 1600 may be suitably terminated, such as, for example, using a small radius fiber loop.

Modifications, additions, or omissions may be made to the filter systems 1500 and 1600 described without departing from the scope of the invention. The components of the filter systems 1500 and 1600 described may be integrated or separated according to particular needs. Moreover, the operations of the filter systems 1500 and 1600 described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A system for communicating optical signals over a network, comprising:
   an upstream terminal, the upstream terminal comprising a signal source operable to transmit a downstream signal comprising at least traffic in a first wavelength and traffic in a second wavelength, the upstream terminal operable to receive upstream traffic in a third wavelength, wherein the third wavelength is shared by a first plurality of downstream terminals and a second plurality of downstream terminals; and
   a distribution node comprising:
      a wavelength router operable to receive the downstream signal, to route the traffic in the first wavelength to the first plurality of downstream terminals, and to route the traffic in the second wavelength to the second plurality of downstream terminals; and
      at least one filter coupled to a switch, the switch operable to selectively switch the filter such that the filter no longer receives any downstream traffic.

2. The system of claim 1, wherein the downstream signal further comprises traffic in a fourth wavelength for communication to at least the first plurality and the second plurality of downstream terminals.

3. The system of claim 1, wherein the downstream signal further comprises traffic in a fourth wavelength, and wherein the distribution node further comprises at least one power splitter operable to receive the traffic in the fourth wavelength and split the traffic in the fourth wavelength into a plurality of copies for communication to at least each of the first plurality and the second plurality of downstream terminals.

4. The system of claim 3, wherein the distribution node further comprises at least a first combining element and a second combining element, wherein:
   the first combining element is operable to:
      receive the traffic in the first wavelength from the wavelength router;
      receive a first copy of the traffic in the fourth wavelength from the power splitter;
      combine the traffic in the first wavelength with the first copy of the traffic in the fourth wavelength into a first combined signal; and forward the first combined signal to the first plurality of downstream terminals; and the second combining element is operable to:
receive the traffic in the second wavelength from the wavelength router; receive a second copy of the traffic in the fourth wavelength from the power splitter;
combine the traffic in the second wavelength with the second copy of the traffic in the fourth wavelength into a second combined signal; and
forward the second combined signal to the second plurality of downstream terminals.

5. The system of claim 4, wherein at least one of the first and second combining elements is selected from the group consisting of a filter and a coupler.

6. The system of claim 1, wherein the distribution node is operable to receive traffic in the third wavelength from the downstream terminals, combine the traffic in the third wavelength from the downstream terminals into one combined upstream signal, and forward the combined upstream signal to the upstream terminal.

7. The system of claim 1, wherein the wavelength router comprises a multiplexer.

8. The system of claim 7, wherein the multiplexer comprises a cyclic multiplexer.

9. The system of claim 1, wherein the wavelength router comprises a plurality of cascaded filters.

10. The system of claim 1, wherein the wavelength router comprises at least one power splitter and at least a first filter and a second filter, the power splitter operable to split the downstream signal into a plurality of copies, the first filter operable to receive a first copy from the power splitter and forward the traffic in the first wavelength to the first plurality of downstream terminals, the second filter operable to receive a second copy from the power splitter and forward the traffic in the second wavelength to the second plurality of downstream terminals.

11. The system of claim 10, wherein the downstream signal further comprises traffic in a fourth wavelength, wherein the first filter is further operable to forward the traffic in the fourth wavelength to the first plurality of downstream terminals, wherein the second filter is further operable to forward the traffic in the fourth wavelength to the second plurality of downstream terminals.

12. The system of claim 1, wherein the upstream terminal comprises at least one filter coupled to a switch, the switch operable to selectively switch the filter such that the filter no longer receives any downstream traffic.

13. The system of claim 1, wherein the filter is operable to forward the first wavelength and the second wavelength to the wavelength router and forward the third wavelength to the upstream terminal.

14. A method for communicating optical signals over a network, comprising:
transmitting a downstream signal comprising at least traffic in a first wavelength and traffic in a second wavelength from an upstream terminal;
at the upstream terminal, receiving an upstream signal comprising at least traffic in a third wavelength, wherein the third wavelength is shared by a first plurality of downstream terminals and a second plurality of downstream terminals;
at a distribution node, routing the traffic in the first wavelength to the first plurality of downstream terminals; and
at the distribution node, routing the traffic in the second wavelength to the second plurality of downstream terminals;

wherein the distribution node comprises at least one filter coupled to a switch, the method further comprising configuring the switch such that the filter no longer receives any downstream traffic.

15. The method of claim 14, wherein the downstream signal further comprises traffic in a fourth wavelength, further comprising communicating the traffic in the fourth wavelength to at least the first plurality and the second plurality of downstream terminals.

16. The method of claim 14, wherein the downstream signal further comprises traffic in a fourth wavelength, the method further comprising:
at the distribution node, routing the traffic in the fourth wavelength to at least one power splitter;
at the distribution node, splitting the traffic in the fourth wavelength into a plurality of copies; and
at the distribution node, forwarding the copies to at least each of the first plurality and the second plurality of downstream terminals.

17. The method of claim 16, further comprising:
at the distribution node, receiving the routed traffic in the first wavelength and a first copy of the traffic in the fourth wavelength at a first combining element;
forwarding the routed traffic in the first wavelength and the first copy of the traffic in the fourth wavelength to the first plurality of downstream terminals;
receiving the routed traffic in the second wavelength and a second copy of the traffic in the fourth wavelength at a second combining element; and
forwarding the routed traffic in the second wavelength and the second copy of the traffic in the fourth wavelength to the second plurality of downstream terminals.

18. The method of claim 17, wherein at least one of the first and second combining elements is selected from a group consisting of a filter and a coupler.

19. The method of claim 14, further comprising:
at the distribution node, receiving traffic in the third wavelength from the downstream terminals;
at the distribution node, combining the traffic in the third wavelength from the downstream terminals into one combined upstream signal; and
at the distribution node, forwarding the combined upstream signal to the upstream terminal.

20. The method of claim 14, wherein the routing is performed by a multiplexer.

21. The method of claim 20, wherein the multiplexer comprises a cyclic multiplexer.

22. The method of claim 14, wherein the routing is performed by a plurality of cascaded filters.

23. The method of claim 14, wherein the routing is performed by a power splitter and at least a first filter and a second filter, the power splitter operable to split the downstream signal into a plurality of copies, the first filter operable to receive a first copy from the power splitter and forward the traffic in the first wavelength to the first plurality of downstream terminals, the second filter operable to receive a second copy from the power splitter and forward the traffic in the second wavelength to the second plurality of downstream terminals.

24. The method of claim 23, wherein the downstream signal further comprises traffic in a fourth wavelength, wherein the first filter is further operable to forward the traffic in the fourth wavelength to the first plurality of downstream terminals, wherein the second filter is further operable to forward the traffic in the fourth wavelength to the second plurality of downstream terminals.

25. The method of claim 14, wherein the upstream terminal comprises at least one filter coupled to a switch, the switch operable to selectively switch the filter such that the filter no longer receives any downstream traffic.

26. The method of claim 14, further comprising:
- at the filter, forwarding the first wavelength and the second wavelength to a wavelength router for routing; and
- at the filter, forwarding the third wavelength to the upstream terminal.

27. A system for communicating optical signals over a network, comprising:
- an upstream terminal, the upstream terminal comprising a signal source operable to transmit a downstream signal comprising at least traffic in a first wavelength and traffic in a second wavelength; and
- a distribution node comprising:
  - a wavelength router operable to:
    - receive the downstream signal;
    - route the traffic in the first wavelength to a first plurality of downstream terminals; and
    - route the traffic in the second wavelength to the second plurality of downstream terminals; and
  - at least one filter coupled to a switch, the switch operable to selectively switch the filter such that the filter no longer receives any downstream traffic.

* * * * *